United States Patent
Sasaki

(10) Patent No.: US 6,720,797 B2
(45) Date of Patent: Apr. 13, 2004

(54) PASS TRANSISTOR CIRCUIT WITH EXCLUSIVE CONTROLS

(75) Inventor: Mitsuru Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 17 days.

(21) Appl. No.: 09/726,607

(22) Filed: Dec. 1, 2000

(65) Prior Publication Data

US 2002/0000835 A1 Jan. 3, 2002

(30) Foreign Application Priority Data

Jun. 15, 2000 (JP) ........................ 2000-180393

(51) Int. Cl.$^7$ .............. H03K 19/20; G06F 9/45
(52) U.S. Cl. .............. 326/113; 326/114; 716/6
(58) Field of Search .............. 326/113, 114, 326/112, 119, 121, 104, 105, 106, 108; 716/1, 4–6

(56) References Cited

U.S. PATENT DOCUMENTS

| | | | |
|---|---|---|---|
| 5,020,013 A | * | 5/1991 | Maher et al. .............. 708/209 |
| 5,712,792 A | | 1/1998 | Yamashita et al. |
| 5,973,507 A | * | 10/1999 | Yamazaki .............. 326/52 |
| 6,232,799 B1 | * | 5/2001 | Allen et al. .............. 326/113 |
| 6,288,568 B1 | * | 9/2001 | Bauer et al. .............. 326/39 |

FOREIGN PATENT DOCUMENTS

| | | | | |
|---|---|---|---|---|
| JP | 3-216726 | | 9/1991 | |
| JP | 404111611 A | * | 4/1992 | .............. 326/113 |
| JP | 9-6821 | | 1/1997 | |
| JP | 9-321146 | | 12/1997 | |
| JP | 10-200394 | | 7/1998 | |
| JP | 11-184899 | | 7/1999 | |

\* cited by examiner

*Primary Examiner*—James H. Cho
(74) *Attorney, Agent, or Firm*—Arent Fox Kintner Plotkin & Kahn, PLLC

(57) ABSTRACT

A pass transistor circuit comprises a plurality of pass transistors connected in parallel. The same input signal is inputted into the sources of these pass transistors. Continuities of these pass transistors are controlled by a plurality of control signals having an exclusive relationship therebetween. A plurality of buffers respectively drive the drive segments including at least the pass transistors and wirings. The drive segments being a plurality of divided ranges each having an equal potential.

5 Claims, 23 Drawing Sheets

(PROTOTYPE)

(CHANGE 1)

(CHANGE 2)

FIG.12A
FIG.12B
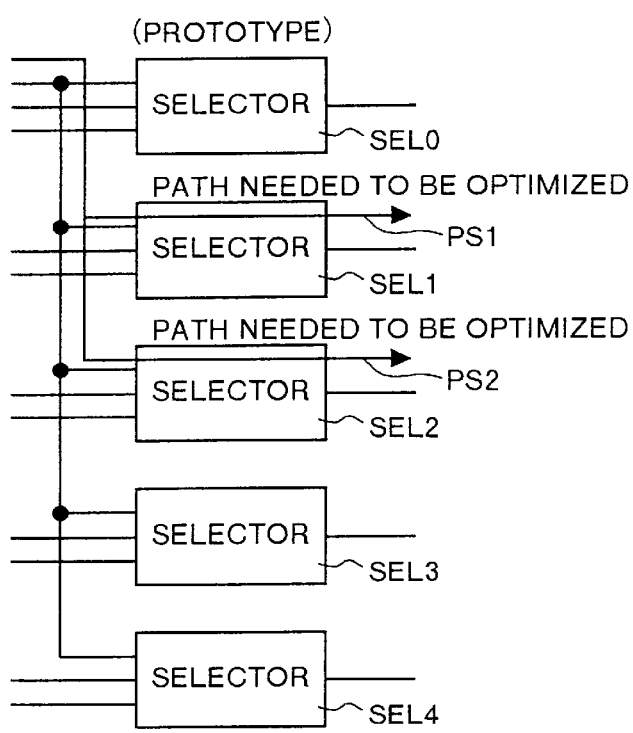
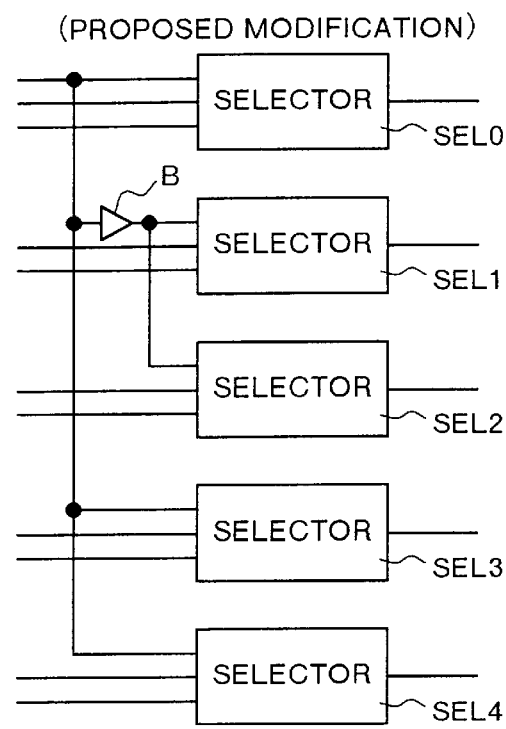

(PROTOTYPE)

(PROPOSED MODIFICATION)

FIG.14

| | [0:7] | [8:15] | [16:23] | [24:31] | [32:39] | [40:47] | [48:55] | [56:63] |
|---|---|---|---|---|---|---|---|---|
| CONTROL PATTERN 1 | all'0' | all'0' | all'0' | all'0' | all'0' | all'0' | all'0' | byte0 |
| CONTROL PATTERN 2 | all'0' | all'0' | all'0' | all'0' | all'0' | all'0' | byte0 | byte1 |
| CONTROL PATTERN 3 | all'0' | all'0' | all'0' | all'0' | byte0 | byte1 | byte2 | byte3 |
| CONTROL PATTERN 4 | byte0 | byte1 | byte2 | byte3 | byte0 | byte1 | byte2 | byte3 |
| CONTROL PATTERN 5 | byte0 | byte1 | byte2 | byte3 | byte4 | byte5 | byte6 | byte7 |

OUTPUT DATA PATTERN (G)

PASS TRANSISTOR CIRCUIT WITH EXCLUSIVE CONTROLS

FIELD OF THE INVENTION

The present invention relates to a pass transistor circuit used as a selector employing pass transistors, a pass transistor circuit design method, a logic circuit optimization device used to optimize buffering in designing a logic circuit, a logic circuit optimization method and a computer-readable recording medium in which a computer program which when executed on a computer realizes the method according to the present invention.

BACKGROUND OF THE INVENTION

In the recent semiconductor LSI (Large Scale Integrated Circuit) field, a method for designing a logic circuit using pass transistors has been widely utilized. Especially, A logic circuit composition method using a binary decision diagram plays a significant role in separating a logic circuit into select logics and putting the design of a logic circuit using pass transistors to practical use. In addition, it is known that in a pass transistor logic circuit, the number of normally used transistors is smaller than the number of CMOS (Complementary Metal Oxide Semiconductor) gates, thereby facilitating realizing low power consumption and high integration.

On the other hand, potential problems with the use of a pass transistor include that the pass transistor lacks in a force for driving other transistors such as a CMOS circuit. Due to this, conventionally, a plurality of stages of pass transistors are connected to thereby cause waveform deformation of an electric signal, thus rather sacrificing timing performance. In these circumstances, demand for providing means and a method capable of overcoming these disadvantages more effectively than before rises.

Recently, with the progress of the high integration of a semiconductor integrated circuit, attention is increasingly paid to a pass transistor capable of realizing high integration with low power consumption. A technique of this type has been frequently used in designing mainly a memory or a programmable logic array. Since the design of a logic circuit employing a binary decision diagram theory was published, this technique has been employed positively with a view to higher integration, lower power consumption and higher speed.

The binary decision diagram theory is a theory for realizing logic circuit design in which a logic function is translated to an appropriate binary tree by using the binary decision diagram and the resultant tree is replaced by a pass transistor selector having a pair of exclusive select inputs and one output. Conventionally, logic composition and circuit optimization are carried out based on the binary decision diagram theory.

For example, Japanese Patent Application Laid-Open No. 9-6821 (to be referred to as "Publication 1" hereinafter) discloses a method of efficiently probing a binary decision diagram. According to this method, temporary circuits of AND and OR circuits are composed from a logic function and grouped based on the input correlation, and the binary decision graph is probed while optimizing a combination of groups to thereby replace the circuits by a pass transistor selector.

Meanwhile, it has become conventionally possible to easily create a logic by applying pass transistors to a logic circuit. Although effective in solving a select logic, the pass transistor has an essential disadvantage in that a signal driving force should be supplied from another CMOS gate. This disadvantage is, therefore, one factor which makes circuit design difficult.

Further, in designing logic, if a circuit logically composed using a pass transistor cannot be actually used due to the occurrence of a waveform deformation, it is necessary to change circuit arrangement. To do so, a method for intentionally mixing an optimal combination of CMOS logics into a logic circuit including pass transistors, is adopted.

Japanese Patent Application Laid-Open No. 9-321146 (to be referred to as "Publication 2" hereinafter) and Japanese Patent Application Laid-Open No. 10-200394 (to be referred to as "Publication 3" hereinafter) disclose the above-stated method as well as a method for optimizing a circuit area, delay time and power consumption. Namely, Publication 2 discloses a method including registering both logically equivalent CMOS circuit and pass transistor circuit cells in a library and combining them according to required conditions so as to allow the mixture of the CMOS logic and the pass transistor logic and to automatically optimize the circuit area, delay time and power consumption.

Publication 3 discloses a method including replacing portions having inputs fixed to "0" and "1" of a pass transistor type logic circuit created based on the binary decision diagram theory by NAND and NOR circuits of a logically equivalent CMOS circuits and adjusting the circuits in light of the performance and required values of the overall circuits.

As disclosed by Publications 2 and 3, it is conventionally impossible to satisfy required performance only with the pass transistor logic and the CMOS logic is, therefore, still employed to the ordinary design of logic. Nevertheless, the pass transistors are often used only for a pass transistor selector circuit capable of making most use of the features of the CMOS theory.

FIG. 23A shows a design example 1 of a conventional logic circuit (or the pass transistor selector circuit in this case). The pass transistor selector circuit shown therein consists of n NMOS pass transistors t0 to tn provided at an input side and an inverter inv0 and a voltage holding PMOS transistor pt0 provided at an output side. Input signals s0 to sn are inputted into the input terminals i0 to in of these pass transistors t0 to tn, respectively. In addition, the continuities of the pass transistors t0 to tn are controlled by control signals se10 to se1n inputted into gates g0 to gn, respectively. Here, the level of only one of the control signals se10 to se1n is H (active) and the levels of the remaining control signals are L.

The drains d0 to dn of the pass transistors t0 to tn, respectively, are connected to the input terminal of the inverter inv0. The inverter inv0 inverts the output signal of any one of the pass transistors t0 to tn and outputs the inverted signal as an output signal o0. This inverter inv0 exists at a node n0. The voltage holding PMOS transistor pt0 is intended to hold voltage. The drain dp of the voltage holding PMOS transistor pt0 is connected to the input terminal of the inverter inv0 and the gate gp thereof is connected to the output terminal of the inverter inv0.

If the level of the control signal se10 is set at H and those of the other control signals se1 to se1n are set at L, then only the pass transistor t0 becomes continuous and an input signal s0 is thereby selected from among the input signals s0 to sn. As a result, the input signal s0 is inverted by the inverter inv0 and then outputted as an output signal o0.

Additionally, a pass transistor selector circuit shown in FIG. 23B is conventionally used. In FIG. 23B, a selector function is realized by employing complementary transfer gates C0 to Cn instead of the pass transistors t0 to tn shown in FIG. 23A. It is noted that the pass transistor selector circuit shown in FIG. 23B is not provided with a voltage holding PMOS transistor pt0 and in this case (like shown in FIG. 23B), any CMOS gate (AND, OR, etc. . . .) can be switched instead of inverter inv0 (Not shown).

In the meantime, as already stated above, the conventional design has disadvantage in that the load capacity of the pass transistor selector circuit dynamically changes according to the values of the control signals se10 to se1n shown in FIG. 23A. Namely, if the level of the control signal se10 is H and the levels of the control signals se11, se12, . . . and se1n are L, then a load capacity Ct to be driven from the input terminal i0 becomes the sum of parasitic capacities Cs0 and Cd0 at the source and drain d0 of the pass transistor t0 through which the input signal s0 passes, a gate capacity Cinv0 at the gate of the inverter inv0, a parasitic capacity Cdp at the drain dp of the voltage holding PMOS transistor pt0 and drain capacities Cd1 to Cdn at the drains d1 to dn of the respective pass transistors t1 to tn. This load capacity Ct is expressed by the following equation (1):

$$Ct=Cs0+(Cd0+Cd1+\ldots+Cdn)+Cdp+Cinv0\ldots \quad (1)$$

On the other hand, if the level of the control signal se10 is L, a load capacity Ct' to be driven from the input terminal i0 becomes a parasitic capacity Cs0 at the source of the pass transistor t0 and expressed by the following equation (2):

$$Ct'=Cs0 \quad (2)$$

Conventionally, therefore, the load capacity of the pass transistor selector circuit dynamically changes (to the load capacity Ct or the load capacity Ct') according to the values (H level or L level) of the control signals se10 to se1n. Thus, a problem arises particularly when handling the pass transistor selector circuit as some units.

Namely, as shown in FIG. 9, if one wiring (signal line) is used as the input line of two or more pass transistors (in case of FIG. 9, pass transistors t0, t2, t4 and t6), the magnitude of the load capacity at the input terminal varies according to the patterns of the control signals controlling the continuities of the respective pass transistors. In FIG. 9, the wiring of an input signal aO is connected to the respective sources of the four pass transistors t0, t2, t4 and t6.

Here, in a case where only the pass transistor t0 selects the input signal a0 among the pass transistors t0, t2, t4 and t6, i.e., the level of the control signal sa0 is H and the levels of the control signals sa1, sa2 and sa3 are L, then the load capacity is the sum of the capacity of a load connected to the node n0 and the parasitic capacities at the respective source of the pass transistors t2, t4 and t6.

On the other hand, in a case where all of the pass transistors to, t2, t4 and t6 select the input signal a0, i.e., the levels of the control signals sa0, sa1, sa2 and sa3 are H, then the loads of the inverters inv0 to inv3 connected to the nodes n0 to n3, respectively and the pass transistors t1, t3, t5 and t7 which do not select the input signal a0 are to be driven by one buffer (not shown) for the input signal a0 in a front stage, with the result that the circuit becomes disadvantageously unbalanced.

Such a phenomenon always occurs irrespectively of the number of connections of the pass transistor selector circuit and the number of control signals (or the number of pass transistors) of the pass transistor selector circuit. In case of the constitution in which pass transistor selector circuits employing pass transistors are connected in parallel as data path constituent circuits such as shifters and data align circuits, in particular, the number of long data transmission wirings for connecting the pass transistor selector circuits is greater than the number of wirings in an ordinary logic circuit and the load capacity thereof thereby increases. Due to this, in view of the dynamically changing load capacity and the load resistance caused by the long wirings, it is required to consider, for example, minimizing load capacity and load resistance as much as possible in a design phase.

FIG. 24 shows a design example 2 of the conventional logic circuit intended to increase the response speed of the circuit. In FIG. 24, parts corresponding to those in FIG. 2 are denoted by the same reference symbols as those in FIG. 2. In FIG. 24, inverters ia0 and ib0, . . . and ia3 and ib3 are provided at the source sides of pass transistors t0 to t7, respectively and inverters ic0, ic1 . . . and ic3 are provided at output sides thereof. The method of the design example 2 can be expected to advantageously improve the response speed of the circuit. However, due to the increase of the number of logic stages and devices, a packaging area and power consumption disadvantageously increase.

Furthermore, conventionally, if logic circuit packaging operation is automated, it is disadvantageously difficult to handle a parasitic load capacity at an input terminal in a cell design phase. If a net list is composed and a pass transistor circuit employing pass transistors is simply replaced by a cell, an input driving buffer may be inadvertently made large in scale, thus disadvantageously providing a quite imbalanced circuit.

As can be understood from the above, the load capacity dynamically changing according to the control logic (control signal patterns) is one factor which makes it difficult to ensure a driving force even in designing a cell base. This also causes the increase of a packing area and power consumption and the reduction of the response speed due to the waveform deformation of a signal. Moreover, in case of characterizing a circuit by the delay, load capacity and the like of a pass transistor selector circuit employing pass transistors, the circuit is normally required to be characterized by the load capacity Ct expressed by the equation (1), i.e., the worst value, so as to avoid the above disadvantages. It is, therefore, expected to be difficult to adjust the circuit to avoid racing.

Therefore, an object of the present invention is to solve the problem arising due to parallel connection of the pass transistor circuits. Other objects and features of this invention will become apparent from the following description with reference to the accompanying drawings.

SUMMARY OF THE INVENTION

It is an object of the present invention to provide a pass transistor circuit, a pass transistor circuit design method, a logic circuit optimization device, a logic circuit optimization method and a computer-readable recording medium recording a logic circuit optimization program capable of easily optimizing the buffering of a pass transistor circuit (logic circuit) employing pass transistors and obtaining a logic circuit excellent in electric characteristics.

In the pass transistor circuit according to one aspect of the present invention, a plurality of pass transistors are connected in parallel, same input signal is inputted into the input terminals of these pass transistors, and continuities of the plurality of pass transistors is controlled by a plurality of control signals having an exclusive relationship therebetween. Further, a plurality of buffers are provided for driving the drive segments including at least the plurality of pass transistors and wirings, the drive segments being a plurality of divided ranges each having an equal potential.

Thus, the plurality of control signals have an exclusive relationship therebetween, i.e., the control signals do not become active simultaneously, a circuit is divided into a plurality of ranges each having an equal potential as drive segments to thereby drive the drive segments independently using buffers, respectively. As a result, it is possible to easily optimize buffering and obtain a pass transistor circuit excellent in electric characteristics, compared with a conventional circuit.

The logic circuit optimization device according to another aspect of the present invention comprises a logic specification indication unit which indicates logic specifications so that a plurality of control signals controlling continuities of the plurality of pass transistors, respectively, have an exclusive relationship therebetween; a cell library unit which registers a plurality of cell data used to design the logic circuit; and an optimization unit which conducts a logic composition based on the logic specifications and the cell data, and for optimizing buffering in the logic circuit.

Thus, the logic specification indication unit indicates logic specifications so that a plurality of control signals have an exclusive relationship therebetween, i.e., the control signals do not become active simultaneously, and logic composition and the optimization of buffering are conducted based on the logic specifications and cell data. As a result, it is possible to easily optimize the buffering of a logic circuit employing pass transistors and obtain a logic circuit excellent in electric characteristics.

BRIEF DESCRIPTION OF THE DRAWINGS

FIG. 12A and FIG. 12B are for explaining a design example 3 in the embodiment;

FIG. 14 is an explanatory view for a design example 4 in the embodiment;

DESCRIPTION OF THE PREFERRED EMBODIMENTS

A preferred embodiment of a pass transistor circuit, a pass transistor circuit design method, a logic circuit optimization device, a logic circuit optimization method and a computer-readable recording medium recording a logic circuit optimization program according to the present invention, will now be explained with reference to the accompanying drawings.

Figure 1:
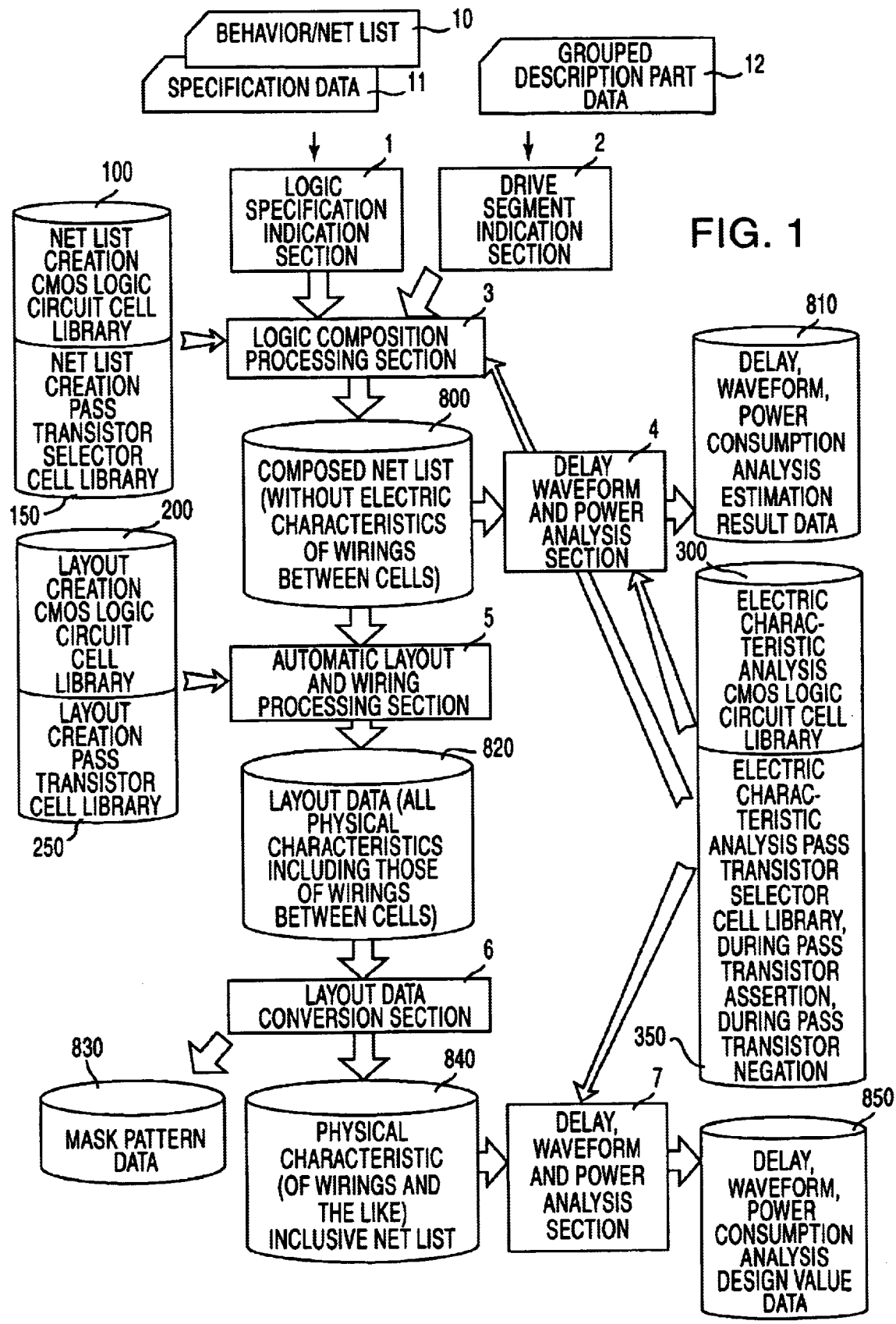
FIG. 1 is a block diagram showing the constitution of one embodiment according to the present invention.

FIG. 1 is a block diagram showing the constitution of one embodiment according to the present invention. In FIG. 1, a logic specification indication section 1 indicates logic specifications relating to a to-be-designed logic circuit. To be specific, the logic specification indication section 1 inputs a behavior/net list 10 and specification data 11 as logic specifications. The behavior/net list 10 is behavior and a net list described in HDL (Hardware Description Language) relating to a to-be-designed logic circuit. As the behavior state transition and the like relating to the logic circuit are described. As the net list, component information, wiring connection information, positional information and the like are described. One example of the logic circuit described herein may be a pass transistor selector circuit already stated above.

Figure 2:
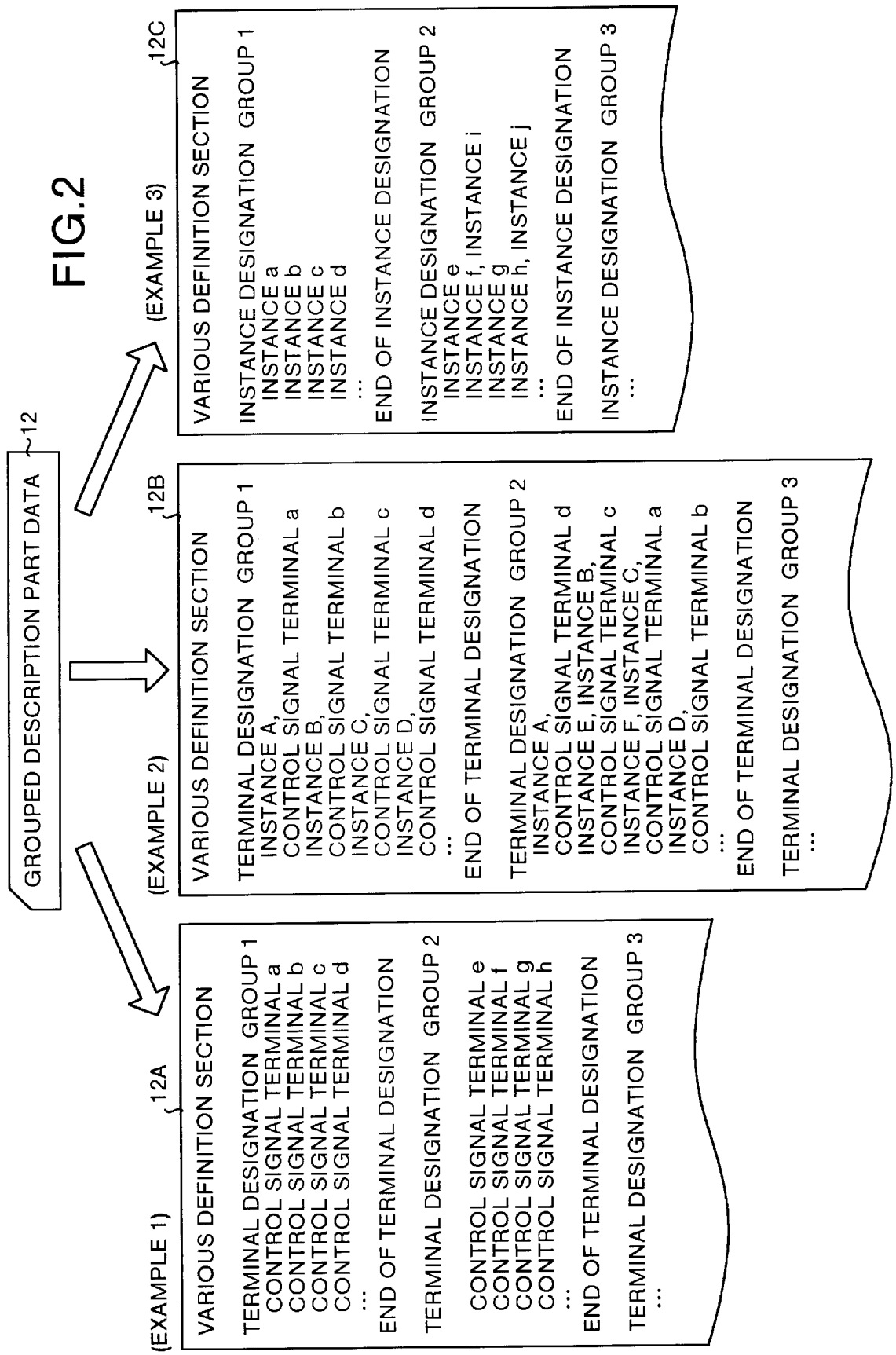
FIG. 2 shows an example of a grouping description part data 12 shown in FIG. 1.

The specification data 11 is expected value data on the input and output of the logic circuit. A drive segment indication section 2 indicates directly or indirectly grouped drive segments constituting the logic circuit to the same node or net according to a certain rule (e.g., the exclusive conditions of control signals). To be specific, the drive segment indication section 2 inputs grouped description part data 12 corresponding to the drive segment. FIG. 2 shows examples of the grouped description part data 12. In FIG. 2, as examples of grouped description part data 12, grouped description part data 12A (example 1), grouped description part data 12B (example 2) and grouped description part data 12C (example 3) are shown.

The grouped description part data 12A defines information on a terminal designation group 1 (control terminals a to d), a terminal designation group 2 (control signals e to h), a terminal designation group 3 . . . designating terminals constituting a drive segment. The grouped description part data 12B defines information on a terminal designation group 1 (instance A, control signal terminal a, . . . and instance D, control signal terminal d), a terminal designation group 2, a terminal designation group 3, constituting the drive segment. The grouped description part data 12C defines information on an instance designation group 1

(instances a to d), an instance designation group 2, an instance designation group 3, . . . . The three types of grouped description part data 12A, 12B and 12C stated above may be recorded together in one recording region of a storage device (not shown) or recorded in a plurality of recording regions, respectively.

Figure 3:
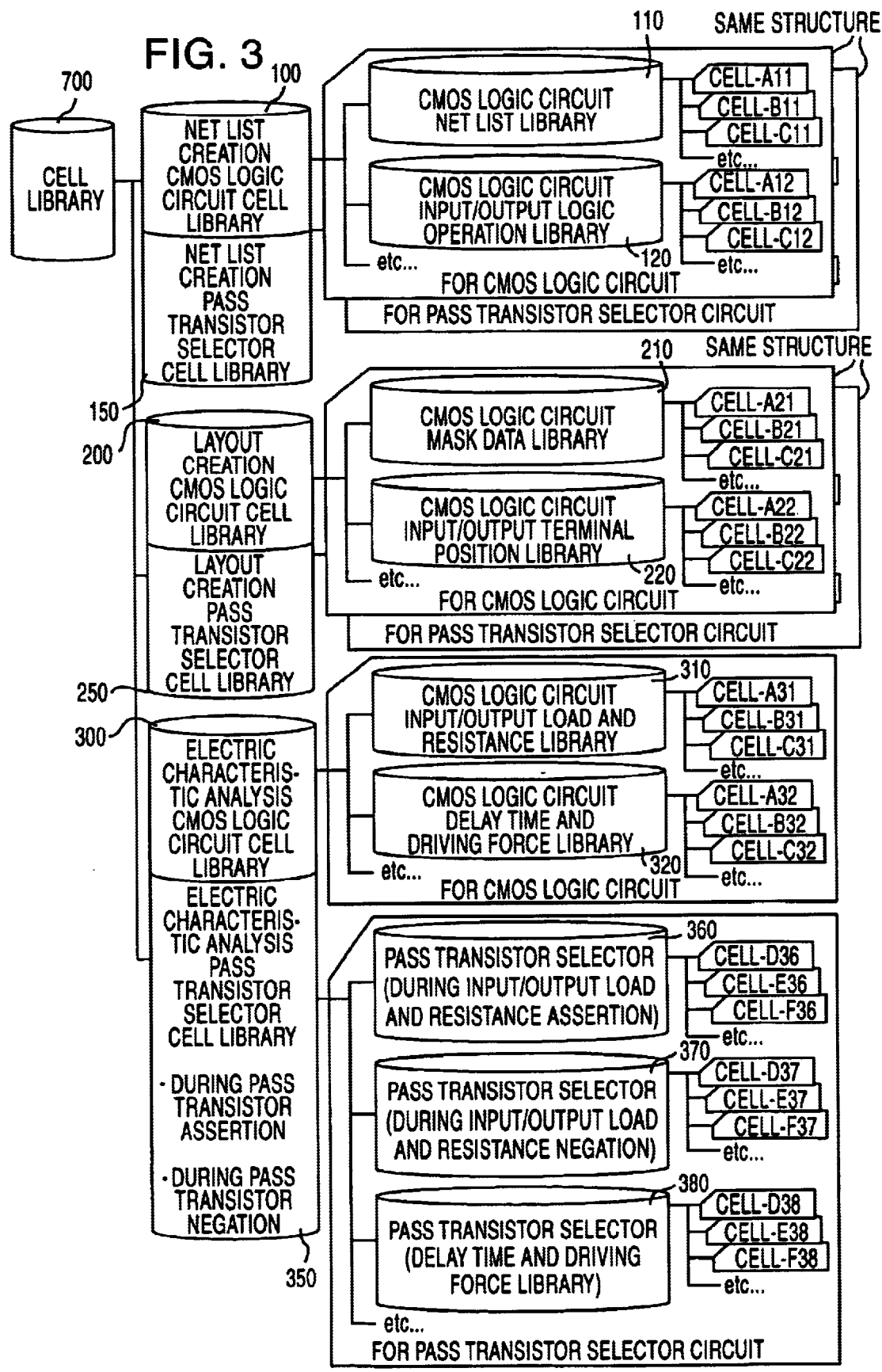
FIG. 3 shows a cell library 700 used in the embodiment.

Here, as one embodiment, analyses as to logic composition, automatic wiring, and the electric characteristics (delay, waveform, power) of the logic circuit are executed based on a cell library 700 shown in FIG. 3. In FIG. 3, parts corresponding to the respective parts shown in FIG. 1 are denoted by the same reference symbols as those in FIG. 1. Data (to be referred to as "cell data" hereinafter) for realizing cells which are considered to be the basic circuits in the design of a logic circuit such as circuits combining logic elements are registered in the cell library 700 according to a cell (fixed pattern) method.

Figure 4:
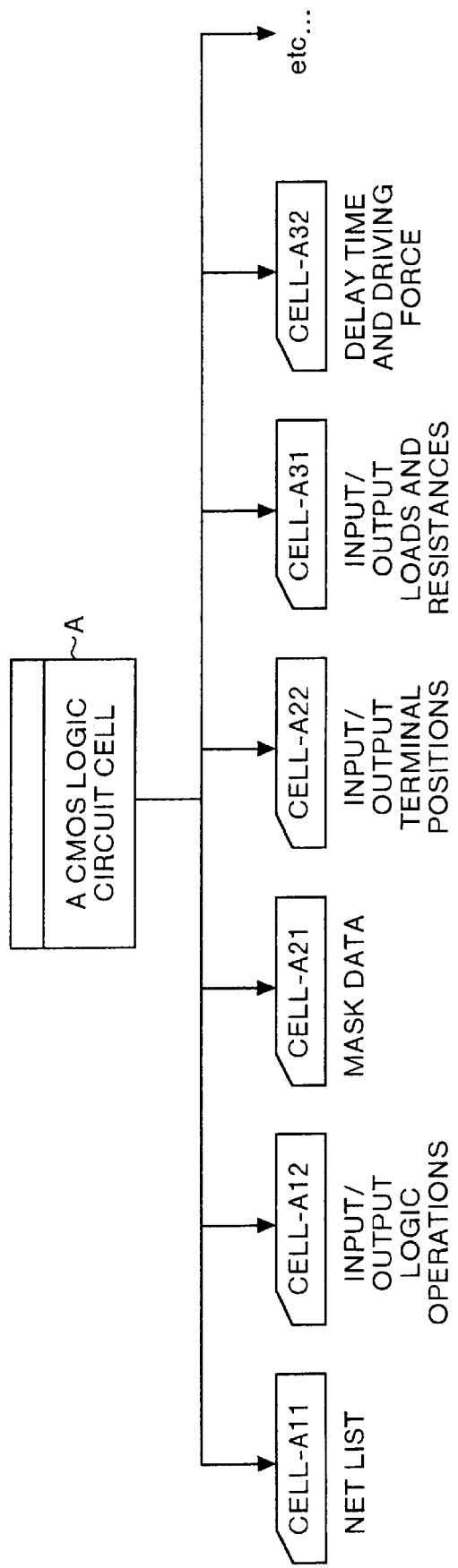
FIG. 4 is an explanatory view for a CMOS logic circuit cell A used in the embodiment.

Cell data for realizing a CMOS logic circuit cell A shown in, for example, FIG. 4, include cell data CELL-A11 on the net list, cell data CELL-A12 (input/output logic operations) on input/output logic operations, cell data CELL-A21 on mask data, cell data CELL-A22 on input/output terminal positions, cell data CELL-A31 on input/output loads and resistances, cell data CELL-A32 on delay time and driving force, . . . . These cell data CELL-A11, CELL-A12, . . . correspond to libraries shown in FIG. 3.

Namely, the cell data CELL-A11 is registered in a CMOS logic circuit net list library 110 (see FIG. 3) and the cell data CELL-A12 is registered in a CMOS logic circuit input/output logic operation library 120 (see FIG. 3). Likewise, the cell data CELL-A21 is registered in a CMOS logic circuit mask data library 210 and the cell data CELL-A22 is registered in a CMOS logic circuit input/output terminal position library 220. The cell data CELL-A31 is registered in a CMOS logic circuit input/output load/resistance library 310 and the cell data CELL-A32 is registered in a CMOS logic circuit delay time/driving force library 320.

Figure 5:
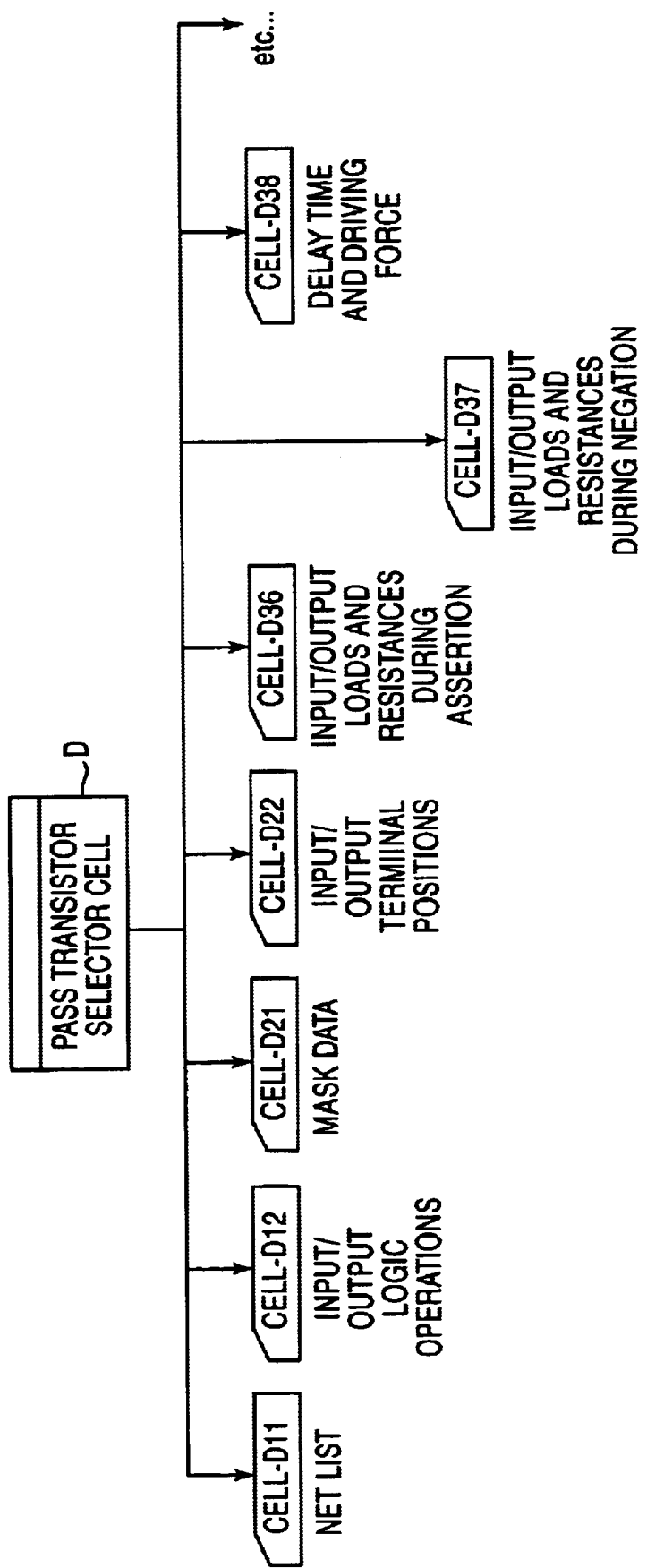
FIG. 5 is an explanatory view for a pass transistor selector cell D used in the embodiment.

Similarly, cell data for realizing a pass transistor selector cell D shown in FIG. 5 include cell data CELL-D11 on the net list, cell data CELL-D12 on input/output logic operations, cell data CELL-D21 on mask data, cell data CELL-D22 on input/output terminal positions, cell data CELL-D36 on input/output loads and resistances during assertion, cell data CELL-D37 on input/output loads and resistances during negation, cell data CELL-D38 on delay time and driving force, . . . These cell data CELL-D11, CELL-D12, . . . correspond to libraries shown in FIG. 3.

Namely, the cell data CELL-D11 is registered in a pass transistor selector circuit net list library (not shown) of a net list creation pass transistor selector cell library 150 (see FIG. 3). The cell data CELL-D12 is registered in a pass transistor selector circuit input/output logic operation library (not shown) of the net list creation pass transistor selector cell library 150.

Likewise, the cell data CELL-D21 is registered in a pass transistor selector circuit mask data library (not shown) of a layout creation, pass transistor selector cell library 250. The cell data CELL-D22 is registered in a pass transistor selector input/output terminal position library (not shown) of the layout creation pass transistor selector cell library 250. The cell data CELL-D36 is registered in a pass transistor selector library 360. The cell data CELL-D37 is registered in a pass transistor selector library 370. The cell data CELL-D38 is registered in a pass transistor selector library 380.

As can be seen, the cell library 700 consists of a net list creation CMOS logic circuit cell library 100, a net list creation pass transistor selector cell library 150, a layout creation CMOS logic circuit cell library 200, a layout creation pass transistor selector cell library 250, an electric characteristic analysis CMOS logic circuit cell library 300 and an electric characteristic analysis pass transistor selector cell library 350 (see FIG. 1).

The net list creation CMOS logic circuit cell library 100 is a library in which data on a cell (CMOS logic circuit) for creating a net list. The library 100 consists of a CMOS logic circuit net list library 110 and a CMOS logic circuit input/output logic operation library 120. In the CMOS logic circuit net library 110, the cell data CELL-A11, CELL-B11, CELL-C11, . . . for creating the net list of the CMOS logic circuit are registered. In the CMOS logic circuit input/output logic operation library 120, the cell data CELL-A12, CELL-B12, CELL-C12, . . . on the input/output logic operation of the CMOS logic circuit are registered.

On the other hand, the net list creation pass transistor selector cell library 150 is the same in structure as the net list creation CMOS logic circuit cell library 100. The library 150 consists of a pass transistor selector circuit net list library and a pass transistor selector circuit input/output logic operation library (both of which libraries are not shown). While the net list creation CMOS logic circuit cell library 100 consists of data on a plurality of cells for the CMOS logic circuit, the net list creation pass transistor selector cell library 150 consists of data on a plurality of cells for the pass transistor selector circuits. Here, the pass transistor selector circuit means a selector circuit employing the pass transistors.

The layout creation CMOS logic circuit cell library 200 is a library in which data on a plurality of cells on the layout of the mask pattern of the CMOS logic circuit. The library 200 consists of a CMOS logic circuit mask data library 210 and a CMOS logic circuit input/output terminal position library 220.

In the CMOS logic circuit mask data library 210, the cell data CELL-A21, CELL-B21, CELL-C21, . . . on the mask pattern of the CMOS logic circuit are registered. In the CMOS logic circuit input/output terminal position library 220, the cell data CELL-A22, CELL-B22, CELL-C22, . . . on the positions of the input/output terminals of the CMOS logic circuit are registered.

On the other hand, the layout creation pass transistor selector cell library 250 is the same in structure as the layout creation CMOS logic circuit cell library 200. The layout creation pass transistor selector cell library 250 consists of pass transistor selector circuit mask data and a pass transistor selector circuit input/output position library (both of which are not shown). While the layout creation CMOS logic circuit cell library 200 consists of data on a plurality of cells for the CMOS logic circuit, the layout creation pass transistor selector cell library 250 consists of data on a plurality of cells for the pass transistor selector circuit.

The electric characteristic analysis CMOS logic circuit cell library 300 is a library in which data on a plurality of cells on the electric characteristics (delay, waveform, power and the like) of the CMOS logic circuit. The library 300 consists of the CMOS logic circuit input/output load and resistance library 310 and the CMOS logic circuit delay time and driving force library 320.

In the CMOS logic circuit input/output load and resistance library 310, the cell data CELL-A31, CELL-B31, CELL-C31, . . . on the input/output loads and resistances of the CMOS logic circuit are registered. In the CMOS logic circuit delay time and driving force library 320, the cell data CELL-A32, CELL-B32, CELL-C32, . . . on the delay time and driving force of the CMOS logic circuit are registered.

On the other hand, the electric characteristic analysis pass transistor selector cell library 350 is a library in which data on a plurality of cells on the electric characteristics (delay, waveform, power and the like) of the pass transistor selector circuit. The library 350 consists of the pass transistor selector libraries 360, 370 and 380. The electric characteristics include those during the assertion of the pass transistor and during the negation thereof.

Figure 6:
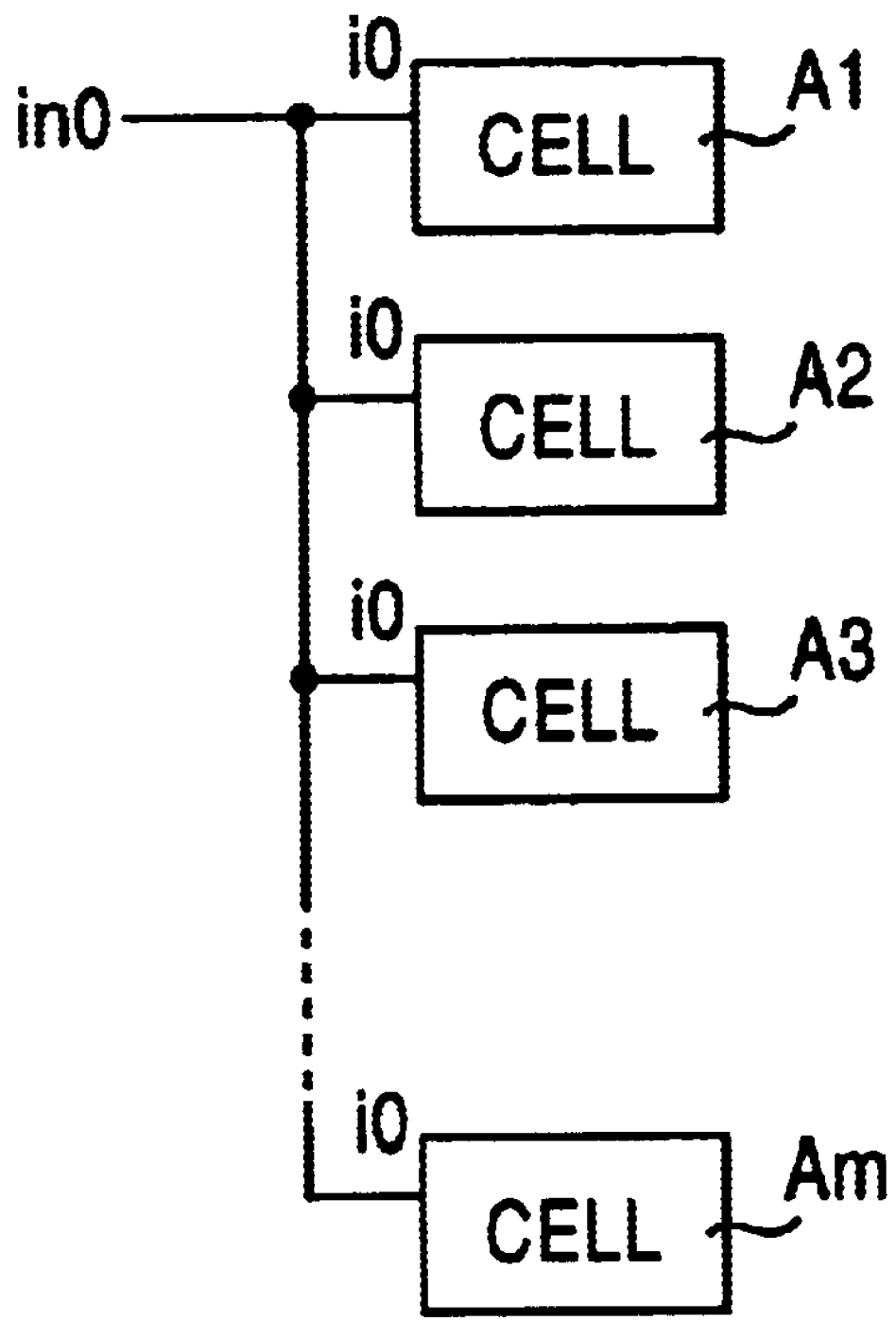
FIG. 6 is an explanation of the operation of the embodiment.
Figure 23A:
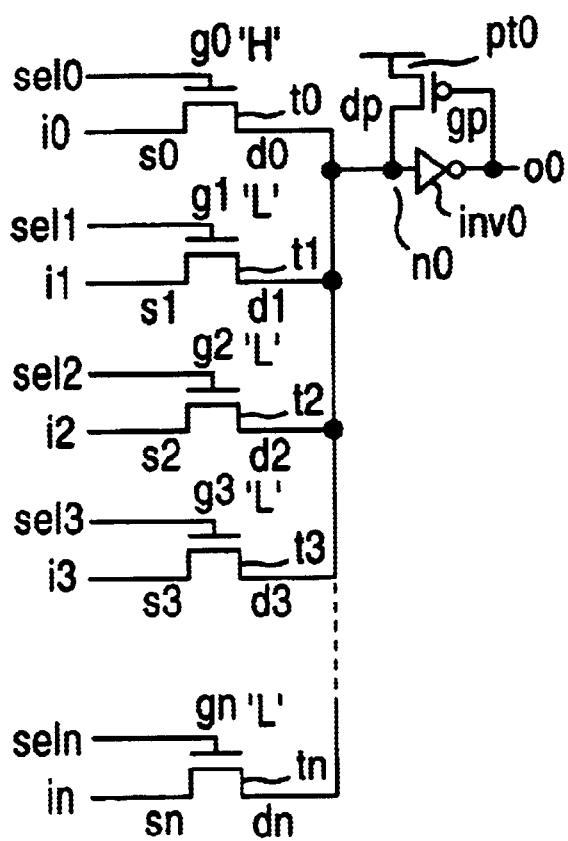
FIG. 23A and FIG. 23B show a design example 1 of a conventional logic circuit.
Figure 23B:
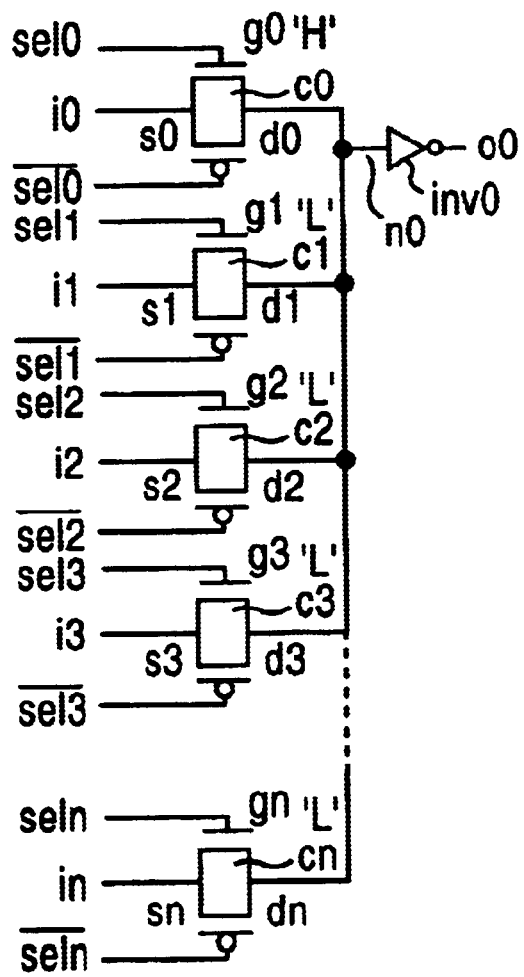
Figure 24:
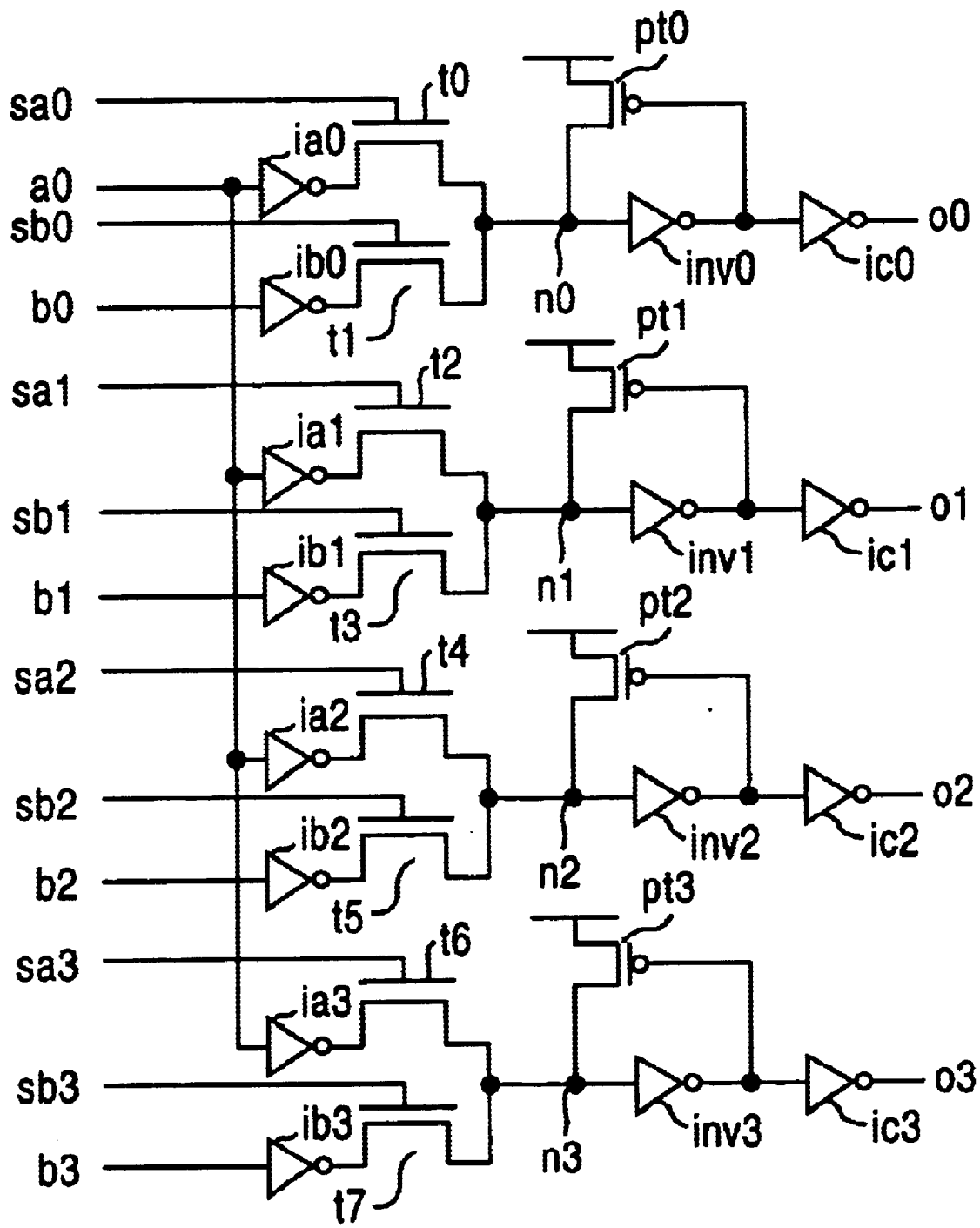
FIG. 24 shows a design example 2 of a conventional logic circuit.

Here, consideration will be given to a case where the pass transistor selector circuits each having n select inputs, i.e., pass transistors t0 to tn as shown in FIG. 23A are cells A1 to Am, respectively shown in FIG. 6 and an input signal in0 is inputted to the respective input terminals i0 in common. In this case, the maximum value Ct of the load capacity ot the input terminal i0 of the cell A1 is expressed by the equation (1) and the minimum value Ct' of the load capacity thereof is expressed by the equation (2).

To characterize a cell, the maximum value Ct and delay time Tt are usually adopted. If m cells, i.e., cells A1 to Am are connected in parallel as shown in FIG. 6, however, the load capacity m·Ct is erroneously recognized as the magnitude of the load of the input terminal i0 and the electric characteristics cannot be analyzed precisely. In that case, the state of the control signal for each pass transistor is checked and, if the transistor is not continuous, the load capacity is set at the minimum value Ct'. During the assertion of the pass transistors, the pass transistor selector library 360 (see FIG. 3) corresponding to the maximum value Ct is employed. During the negation of the pass transistors, the pass transistor selector library 370 corresponding to the minimum value Ct' is employed.

In the pass transistor selector library 360, the cell data CELL-D36, CELL-E36, CELL-F36, . . . on the input/output loads and resistances of the pass transistor select circuit during the assertion of the pass transistors are registered. In the pass transistor selector library 370, the cell data CELL-D37, CELL-E37, CELL-F37, . . . on the input/output loads and resistances of the pass transistor selector circuit during the negation of the pass transistors are registered. In the pass transistor selector library 380, the cell data CELL-D38, CELL-E38, CELL-F38, . . . on the delay time and driving force of the pass transistor selector circuit are registered.

Returning to FIG. 1, the logic composition processing section 3 creates a composed net list 800 by executing a logic composition processing for composing a combination of a plurality of cells based on the specification data 11 from the logic specification indication section 1, the behavior/net list 10, the grouped description part data 12 from the drive segment indication section 2, the net list creation CMOS logic circuit cell library 100,the net list creation pass transistor selector cell library 150, the electric characteristic analysis CMOS logic circuit cell library 300 and the electric characteristic analysis pass transistor selector cell library 350. Normally, the composed net list 800 does not include information on the electric characteristics of wirings between cells.

Figure 7:
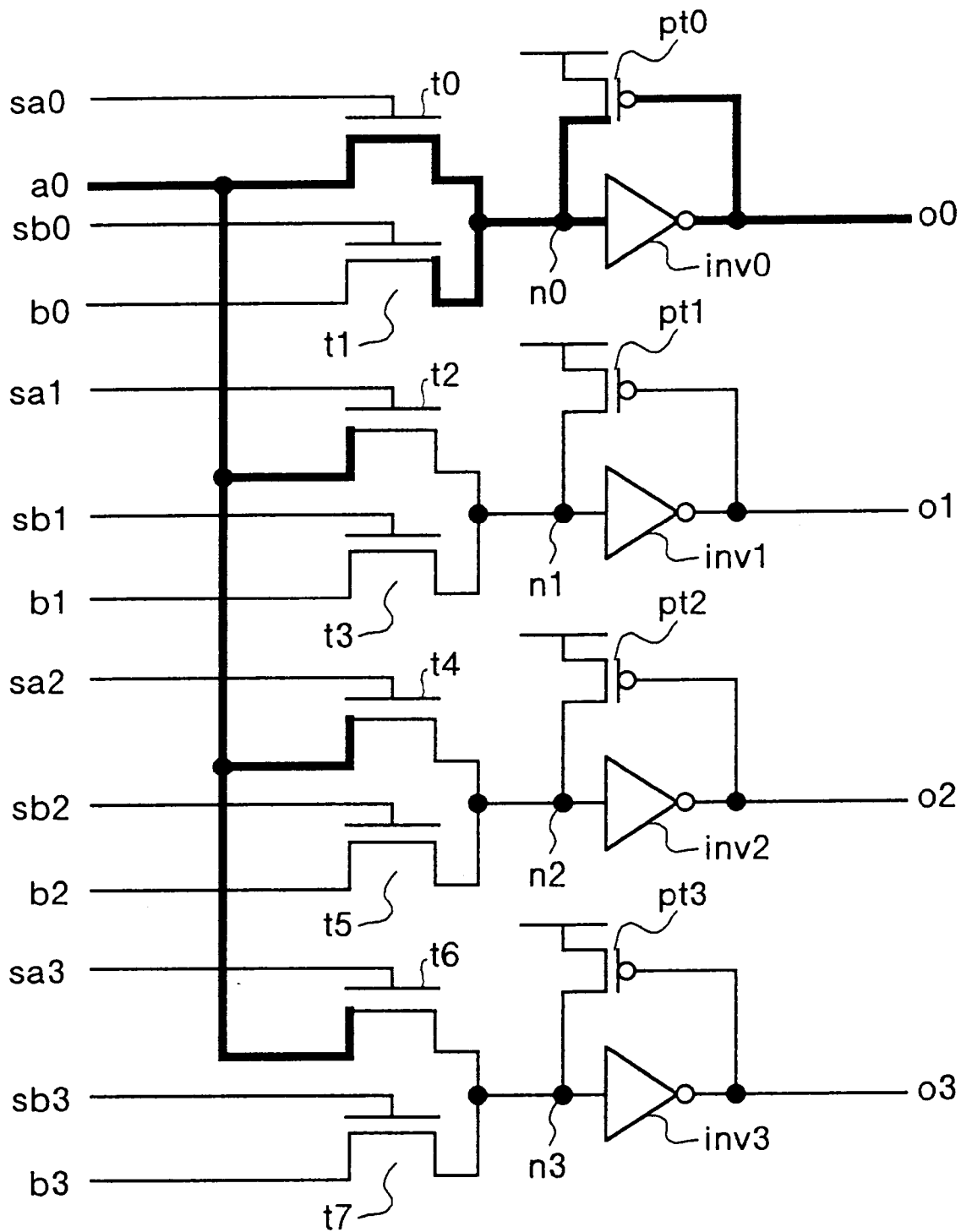
FIG. 7 is an explanatory view for the operation of the embodiment.

A delay, waveform and power analysis section 4 analyzes electric characteristics (delay, waveform, power) relating to the composed net list 800 using the electric characteristic analysis CMOS logic circuit cell library 300 and the electric characteristic analysis pass transistor selector cell library 350, and provides delay, waveform, power consumption analysis estimation result data 810 as an analysis result. Here, if analyzing the delay of the pass transistor selector circuit shown in FIG. 7, the delay, waveform and power analysis section 4 performs analysis as to a path (wiring) indicated by a thick line shown therein.

An automatic layout/wiring processing section 5 creates layout data 820 on the logic circuit using the composed net list 800, the layout creation CMOS logic circuit cell library 200 and the layout creation pass transistor selector cell library 250. The layout data 820 includes all physical characteristics such as those of wirings between cells.

A layout data conversion section 6 converts the layout data 820 into mask pattern data 830 and physical characteristics (of wirings and the like) inclusive net list 840. The mask pattern data 830 is data on the mask pattern in case of forming a logic circuit on a semiconductor substrate. The physical characteristics (of wirings and the like) inclusive net list 840 include physical characteristics of wirings and the like.

A delay, waveform and power analysis section 7 analyzes electric characteristics (delay, waveform and power) relating to the physical characteristics (of wirings and the like) inclusive net list 840 using the electric characteristic analysis CMOS logic circuit cell library 300 and the electric characteristic analysis pass transistor selector cell library 350, and provides delay, waveform and power consumption analysis design value data 850 as an analysis result.

Figure 8:
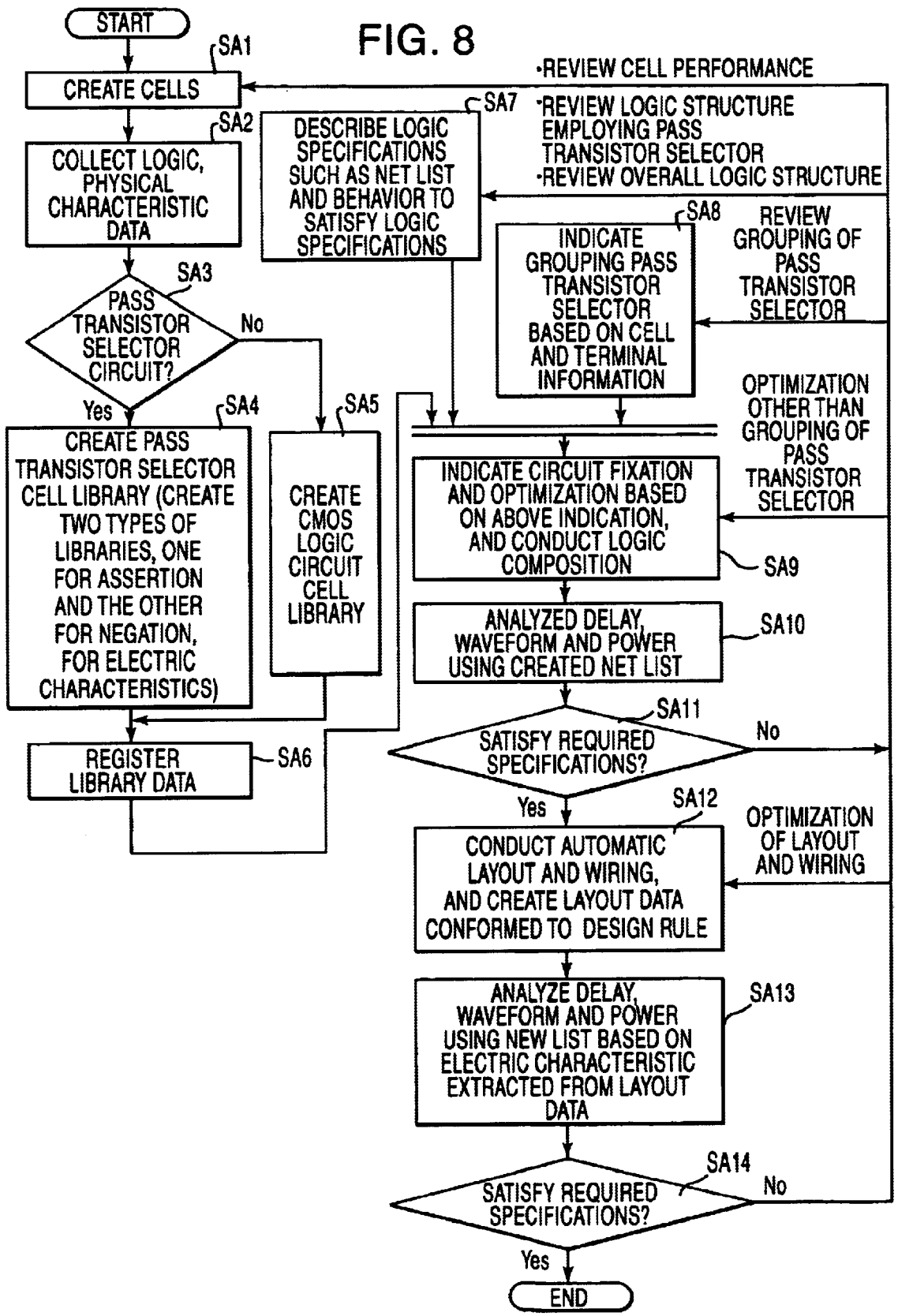
FIG. 8 is a flow chart for describing the operation of the embodiment.

Next, the operation will be described with reference to a flow chart shown in FIG. 8. While the present invention is applied to a logic circuit optimization device serving as a CAD (Computer Aided Design) device, design examples 1 to 5 (see FIGS. 9 to 15) of the logic circuit using this logic circuit optimization device will be described first.

Design Example 1

First, description will be given to a design example 1 for designing a pass transistor selector circuit shown in FIG. 10 obtained by optimizing a pass transistor selector circuit (logic circuit) shown in FIG. 9. The pass transistor selector circuit shown in FIG. 9 has four nodes n0 to n3. From these nodes, selected input signals are outputted as output signals o0 to o3 through inverters inv0 to inv3, respectively. At the node n0, pass transistors t0 and t1 connected in parallel, the inverter inv0 and a voltage holding PMOS transistor pt0 are arranged.

The continuities of these pass transistors t0 and t1 are controlled by control signals sa0 and sb0, respectively and one of input signals a0 and b0 is selected. Namely, if the level of the control signal sa0 is H, the pass transistor t0 becomes continuous and the input signal a0 is selected. If the level of the control signal sb0 is H, the pass transistor t1 becomes continuous and the input signal b0 is selected. Here, the control signals sa0 and sb0 has an exclusive relationship therebetween, i.e., if the level of one signal is H, the level of the other is L and the levels of the both signals do not become H simultaneously.

At the node n1 pass transistors t2 and t3 connected in parallel, the inverter inv1 and a voltage holding PMOS transistor pt1 are arranged. The continuities of these pass transistors t2 and t3 are controlled by control signals sa1 and sb1, respectively and one of input signals a0 and b1 is selected. Namely, if the level of the control signal sa1 is H, the pass transistor t2 becomes continuous and the input signal a0 is selected. If the level of the control signal sb1 is H, the pass transistor t3 becomes continuous and the input signal b1 is selected. Here, the control signals sa1 and sb1 has an exclusive relationship therebetween, i.e., if the level of one signal is H, that of the other is L and the levels of the both signals do not become H simultaneously.

At the node n2, pass transistors t4 and t5 connected in parallel, the inverter inv2 and a voltage holding PMOS transistor pt2 are arranged. The continuities of these pass transistors t4 and t5 are controlled by control signals sa2 and sb2, respectively, and one of input signals a0 and b2 is selected. Namely, if the level of the control signal sa2 is H, the pass transistor t4 becomes continuous and the input signal a0 is selected. If the level of the control signal sb2 is H, the pass transistor t5 becomes continuous and the input signal b2 is selected. Here, the control signals sa2 and sb2 have an exclusive relationship therebetween, i.e., if the level of one signal is H, the level of the other is L and the levels of the both signals do not become H simultaneously.

At the node n3, pass transistors t6 and t7 connected in parallel, the inverter inv3 and a voltage holding PMO transistor pt3 are arranged. The continuities of these pass transistors t6 and t7 are controlled by control signals sa3 and sb3 and one of input signals a0 and b3 is selected. Namely, if the level of the control signal sa3 is H, the pass transistor t6 becomes continuous and the input signal a0 is selected. If the level of the control signal sb3 is H, the pass transistor t7 becomes continuous and the input signal b3 is selected. Here, the control signals sa3 and sb3 have an exclusive relationship therebetween, i.e., if the level of one signal is H, that of the other is L and the levels of the both signals do not become H simultaneously.

Figure 9:
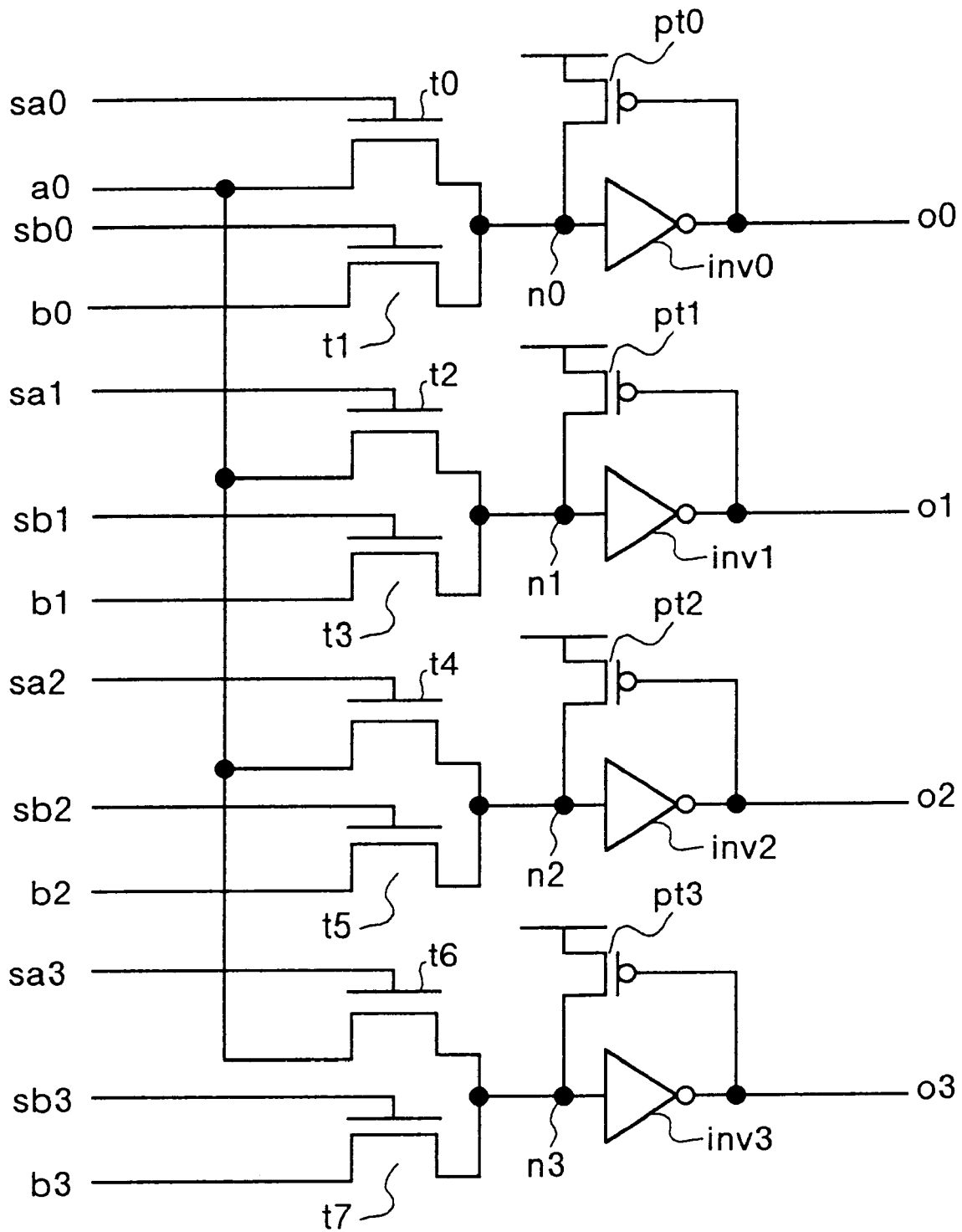
FIG. 9 is an explanatory view for a design example 1 in the embodiment.

Here, in the pass transistor selector circuit shown in FIG. 9, the input signal a0 is a common input signal inputted to the pass transistors t0, t2, t4 and t6. Due to this, it is necessary to drive the load of the load capacity of the worst value seen from the input terminal of the input signal a0 using one buffer (not shown). Namely, in the pass transistor selector circuit showed in FIG. 9, a buffer having an enough and spare driving force (i.e., a buffer ensuring an excessive driving force) is used, which buffer is not preferable in light of reducing power consumption and a packaging area. Further, in the pass transistor selector circuit, the levels of all the control signals sa0, sa1, sa2 and sa3 are often set at H level simultaneously. That is, these control signals sa0, sa1, sa2 and sa3 do not satisfy an exclusive relationship therebetween.

In this embodiment, a range (pass transistor(s), wiring(s), inverter(s), voltage holding PMOS transistor(s), node(s)) driven by one buffer in the pass transistor selector circuit and having the same potential is defined as a drive segment. For example, if only the pass transistor t0 shown in FIG. 9 is continuous and one buffer is connected to the input terminal of the input signal a0, then the drive segment corresponds to a range including the elements (the pass transistor to, the inverter inv0, the voltage holding PMOS transistor pt0) on the node n0, the wirings connected to those elements and wirings connected to the respective sources of the pass transistors t2, t4 and t6.

Furthermore, if both the pass transistors t0 and t2 are continuous and one buffer is connected to the input terminal of the input signal a0, the drive segment corresponds to a range including elements (the pass transistor t0, the inverter inv0, the voltage holding PMOS transistor pt0) on the node 0 and wirings connected to these elements, elements (the pass transistor t2, the inverter inv1, the voltage holding PMOS transistor pt1) on the node ni and wirings connected to these elements, and wirings connected to the respective sources of the pass transistors t4 and t6.

In this way, in the pass transistor selector circuit shown in FIG. 9, the control signals sa0, sa1, sa2 and sa3 do not have an exclusive relationship therebetween. Due to this, the drive segment dynamically changes between the drive segment in a case where the level of the control signal sa0 is H and only the pass transistor t0 is continuous, and the drive segment in a case where the level of the control signal sa0 is H, that of the control signal sa1 is H and both the pass transistors t0 and t2 are continuous.

Accordingly, in the pass transistor selector circuit shown in FIG. 9, the drive segment dynamically changes according to the patterns of the control signals and the load capacity of the load which should be driven by one buffer, therefore, dynamically changes. To deal with such a dynamic change of the load capacity, a buffer capable of driving the load with the load capacity of the worst value (maximum value) is used in the pass transistor selector circuit in FIG. 9. In addition, the load capacity changes since the control signals sa0, sa1, sa2 and sa3 do not have an exclusive relationship therebetween.

Figure 10:
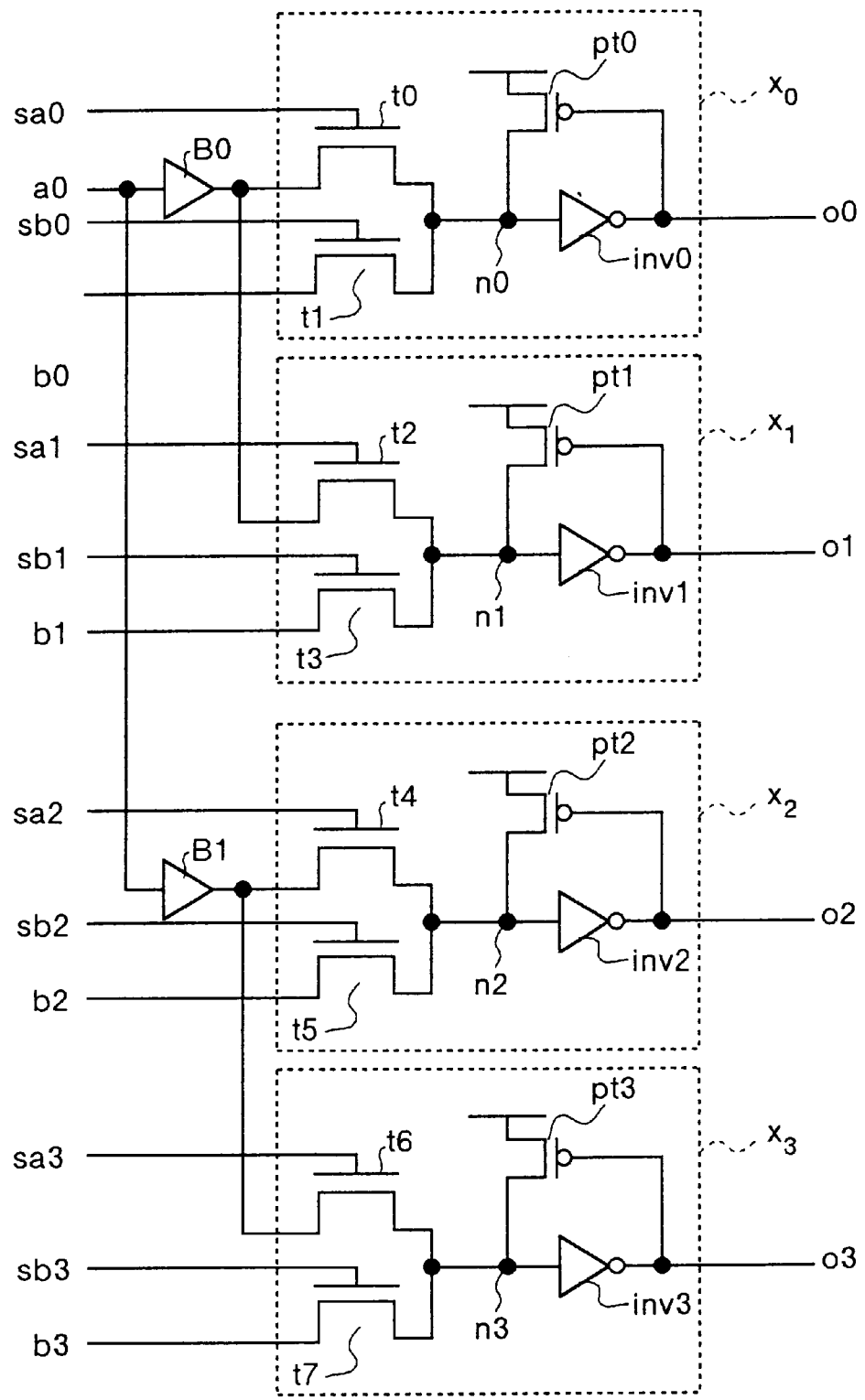
FIG. 10 is an explanatory view for a design example 1 in the embodiment.

Considering this, the pass transistor selector circuit which has been optimized as shown in FIG. 10 is designed so that control signals sa0, sa1, sa2 and sa3 have an exclusive relationship therebetween (i.e., only one control signal is at H level and the other control signals are at L level at the same time). Besides, a range including the pass transistors t0 and t2, wirings and the like, is defined as one drive segment, whereas a range including the pass transistors t4, t6, wirings and the like, is defined as the other drive segment. One drive segment is driven by a buffer B0 and the other drive segment is driven by a buffer B1. Namely, the pass transistor selector circuit shown in FIG. 9 has one drive segment, whereas the pass transistor shown in FIG. 10 has two drive segments.

Further, in the one drive segment, the buffer B0 optimum for driving the sum of a load relating to a pass transistor (e.g., pass transistor t0) selected by the control signal, a load relating to an unselected pass transistor (e.g., pass transistor t2) and a load relating to wirings, is provided. Here, the sum of the plural loads stated above is a value estimated as a worst value. Accordingly, compared with the buffer (not shown) for the pass transistor selector circuit shown in FIG. 9, the buffer B0 does not need to ensure an excessive driving force but it suffices to have a driving force necessary and sufficient (effective driving force).

Likewise, in the other drive segment, the buffer B1 optimum for driving the sum of a load relating to a pass transistor (e.g., pass transistor t4) selected by the control signal, a load relating to an unselected pass transistor (e.g., pass transistor t6) and a load relating to wirings, is provided. Here, the sum of the plural loads stated above is a value estimated as a worst value. Accordingly, compared with the buffer for the pass transistor selector circuit(not shown) in FIG. 9, the buffer B1 does not need to ensure an excessive driving force but it suffices to have a driving force necessary and sufficient (effective driving force).

As can be understood from the above, in the design example 1, the buffers B0 and B1 each having an optimum driving force are provided on the logic circuit as shown in FIG. 10, thereby optimizing the logic circuit. It is noted that the optimization method in the design example 1 (FIG. 10) can be conducted irrespectively of the number of selections of the selector, the number of selectors connected in parallel, the number of input signals of the same selector, the type of pass transistors (NMOS, PMOS, transmission gate) and wiring length.

Next, description will be given to the design example 1 for designing the pass transistor selector circuit (see FIG. 10) with reference to the flow chart shown in FIG. 8. In a step SA1, a plurality of cells constituting the cell library 700 shown in FIG. 3 are created. In a step SA2, logic and physical characteristic data on the respective cells are collected.

In a step SA3, it is judged whether or not the to-be-designed logic circuit is a pass transistor selector circuit. If this judgment result is "Yes", in a step SA4, the net list creation pass transistor selector cell library 150, the layout creation pass transistor selector cell library 250 and the electric characteristic analysis pass transistor selector cell library 350 shown in FIG. 3 are created.

On the other hand, if the judgment result of the step SA3 is "No" in a step SA5, the net list creation CMOS logic circuit cell library 100, the layout creation CMOS logic circuit cell library 200 and the electric characteristic analysis CMOS logic circuit cell library 300 shown in FIG. 3 are created. In a step SA6, the libraries created in either the step SA4 or step SA5 are registered in the cell library 700.

In a step SA7, the behavior/net list 10 described in HDL and the specification data 11 are created as logic specifications. As a result, the logic specification indication section 1 indicates the logic specifications (the behavior/net list 10 and the specification data 11). The logic specifications indicated here are intended to realize the pass transistor selector circuit shown in FIG. 10 and include the exclusive relationship between the control signals, area, delay time, power consumption and the like as already described above.

In a step SA8, grouped description part data 12 (see FIG. 2) on the groups (drive segments) of the pass transistor selector circuit is created based on cell and terminal information. As a result, the drive segment indication section 2 indicates grouping based on the grouped description part data 12. The drive segments here include the pass transistors t0 and t1, the pass transistors t2 and t3, the pass transistors t4 and t5, and the pass transistors t6 and t7 shown in FIG. 10.

In a step SA9, the logic composition processing section 3 designates the fixation and optimization of the circuit and performs a logic composition based on the specification data 11 from the logic specification indication section 1, the behavior/net list 10, the grouped description part data 12 from the drive segment indication section 2, the net list creation pass transistor selector cell library 150 and the electric characteristic analysis pass transistor selector cell library 350. As a result, the logic composition processing section 3 passes the logic composition result to the delay, waveform and power analysis section 4 and to the automatic layout and wiring processing section 5 as the composed net list 800.

In a step SA10, the delay, waveform and power analysis section 4 analyzes electric characteristics (delay, waveform and power) relating to the composed net list 800 using the electric characteristic analysis pass transistor selector cell library 350. In a step SA11, the delay, waveform and power analysis section 4 judges whether or not the electric characteristic analysis result satisfies the required specifications. If this judgment result is "No", the electric characteristic specifications are reviewed and optimized so as to satisfy the required specifications in steps SA7, SA8 and SA9.

That is, in the step SA7, a logic structure employing the pass transistor selector is reviewed and the overall logic structure is reviewed. In the step SA8, the grouping of the pass transistor selector is reviewed. Also, in the step SA9, optimization other than grouping of the pass transistor selector is conducted. As a result, in a step SA10, electric characteristics relating to the composed net list 800 after review and optimization are analyzed.

On the other hand, if the judgment result of the step SA11 is "Yes", the automatic layout and wiring processing section 5 creates layout data 820 on the logic circuit conforming to a design rule based on the composed net list 800 and the layout creation pass transistor selector cell library 250. In a step SA13, the layout conversion section 6 converts the layout data 820 into the physical characteristic (of wirings and the like) inclusive net list 840 and then passes the list 840 to the delay, waveform and power analysis section 7.

Consequently, the delay, waveform and power analysis section 7 analyzes the electric properties (delay, waveform, power) relating to the physical characteristic (of wirings and the like) inclusive net list 840 using the electric characteristic analysis pass transistor selector cell library 350. In a step SA14, the delay, waveform and power analysis section 7 judges whether or not the electric characteristic analysis result satisfies the required specifications. If this judgment result is "No", the layout and wirings are optimized in a step SA12 and processings after a step SA13 are executed.

On the other hand, if the judgment result SA14 is "Yes", i.e., the physical characteristic (of wirings and the like) inclusive net list 840 satisfies the required specifications relating to the electric characteristics, then the layout data conversion section 6 converts the layout data 820 into the mask pattern data 830. Thereafter, based on the mask pattern data 830, the logic circuit shown in FIG. 10 is formed on the semiconductor substrate.

Design Example 2

Next, description will be given to a design example 2 for designing a pass transistor selector circuit shown in FIGS. 11B and 11C obtained by optimizing a pass transistor selector circuit (logic circuit) shown in FIG. 11A. The pass transistor selector circuit (prototype) shown in FIG. 11 has two nodes, i.e., n0 (selector SEL0) and n1 (selector SEL1). From the respective nodes, selected input signals are outputted as output signals o0 and o1.

At the node n0, pass transistors t0 to t3 connected in parallel, an inverter inv0 and a voltage holding PMOS transistor pt0 are arranged. The continuities of these pass transistors t0 to t3 are controlled by control signals sa0, sb0, sc0 and sd0, respectively and one of input signals a0, b0, c0 and d0 is selected. For example, if the level of the control signal sa0 is H, then the pass transistor t0 becomes continuous and the input signal a0 is selected and outputted, as the output signal o0, to a logic circuit 900 in the later stage through the inverter inv0.

At the node n1, pass transistors t4 to t7 connected in parallel, an inverter inv1 and a voltage holding PMOS transistor pt1 are arranged. The input signal a0 is an input signal common to the pass transistors t0 and t4. The continuities of these pass transistors t4 to t7 are controlled by control signals sa1, sb1, sc1 and sd1, respectively and one of input signals a0, b1, c1 and d1 is selected. For example, if the level of the control signal sa1 is H, then the pass transistor t4 becomes continuous and the input signal a0 is selected. The input signal a0 is outputted, as an output signal o1, to the logic circuit 900 in the later stage through the inverter inv1.

Figure 11A:
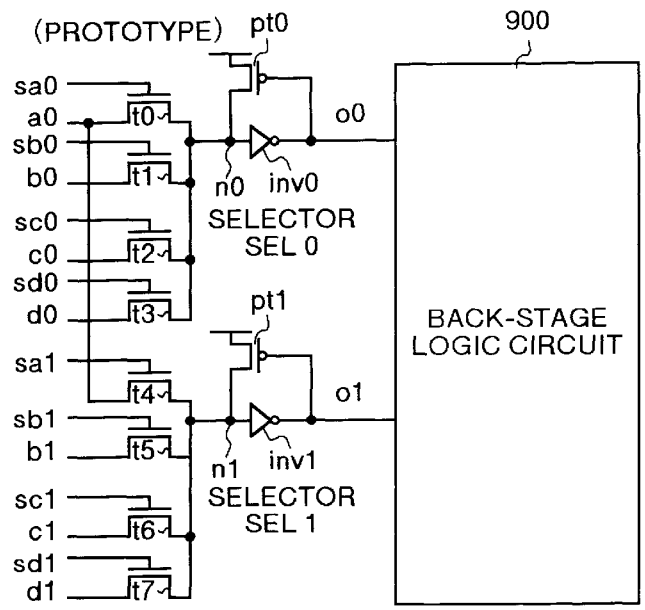
FIG. 11A to FIG. 11C are for explaining a design example 2 in the embodiment.
Figure 11B:
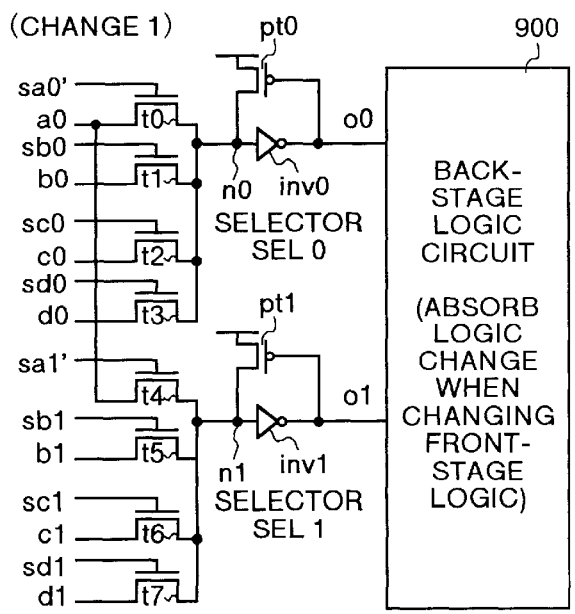

Here, in the logic circuit shown in FIG. 11A, the levels of the control signals sa0 and sa1 often become H simultaneously. In that case, the problem occurs that a load capacity to be driven increases and that optimum buffering cannot be conducted. To avoid this problem, in the design example 2, the behavior/net list 10, the specification data 11 and the grouped description part data 12 shown in FIG. 1 are created so as to intentionally ensure the exclusive relationship between the control signal sa0' and sa1' as shown in FIG. 11B.

By doing so, the levels of the control signals sa0' and sa1' do not become H simultaneously and optimum buffering can be realized, thereby reducing a packaging area and improving delay time and power consumption. That is to say, by intentionally recomposing the selected logics so as to obtain control signals which have an exclusive relationship therebetween for the purpose of creating independent drive segments (selectors SEL0 and SEL1) to optimize buffering, the operation characteristics of the pass transistor circuit improves.

Figure 11C:
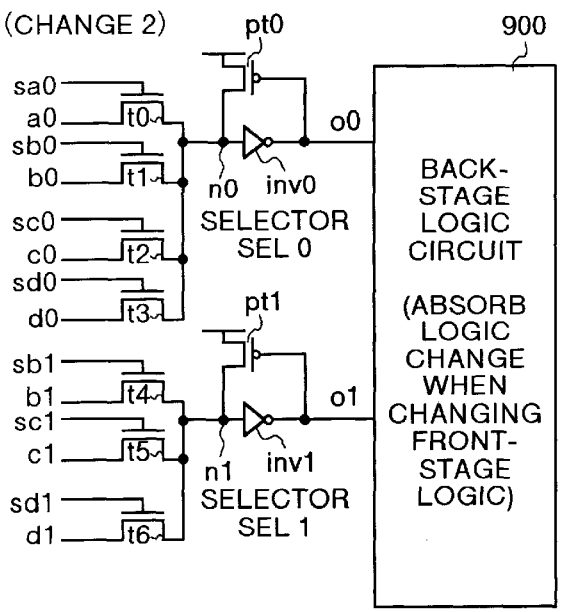

Further, in the design example 2, as shown in FIG. 11C, the behavior/net list 10, the specification data 11 and the grouped description part data 12 are created so that the input signal sa0 may not be inputted into two drive segments (selectors SEL0 and SEL1). It is noted that the logic circuits shown in FIGS. 11B and 11C are designed according to the flow chart shown in FIG. 8. The optimization method in the design example 2 (FIGS. 11B and 11C) can be realized irrespectively of the number of selections of the selectors, the number of selectors connected in parallel, the number of input signals of a single selector, the type of pass transistors (NMOS, PMOS, transmission gate) and wiring length.

Design Example 3

Next, description will be given to a design example 3 for designing a pass transistor selector circuit shown in FIG. 12B obtained by optimizing a pass transistor selector circuit (logic circuit) shown in FIG. 12A. The pass transistor selector circuit (prototype) shown in FIG. 12A consists of four selectors SEL0 to SEL4. Each of the selectors SEL0 to SEL4 is a three-input, one-output type selector and consists of a plurality of pass transistors (not shown). It is noted that FIG. 12A does not show the control signals of the pass transistors. Also, one of the input signals of the selector SEL0 is an input signal common to the other selectors SEL1 to SEL4.

In the design example 3, if it is necessary to optimize (improve buffering) of a path PS1 relating to the selector SEL1 shown in FIG. 12A and a path PS2 relating to the selector SEL2 and it is not necessary to optimize the other paths, then the pass transistor selector circuit shown in FIG. 12B is designed.

Namely, in the design example 3, the selectors SEL1 and SEL2 required to be optimized are partially cut as a drive segment and these selectors SEL1 and SEL2 are subjected to the optimization in either the design example 1 or design example 2 described above, thereby selecting a buffer B for realizing optimum buffering. In the design example 3, the behavior/net list 10, the specification data 11 and the grouped description part data 12 (see FIG. 1) for realizing the optimization are created. It is noted that the pass transistor selector circuit shown in FIG. 12B is designed according to the flow chart shown in FIG. 8.

Design Example 4

Figure 13A:
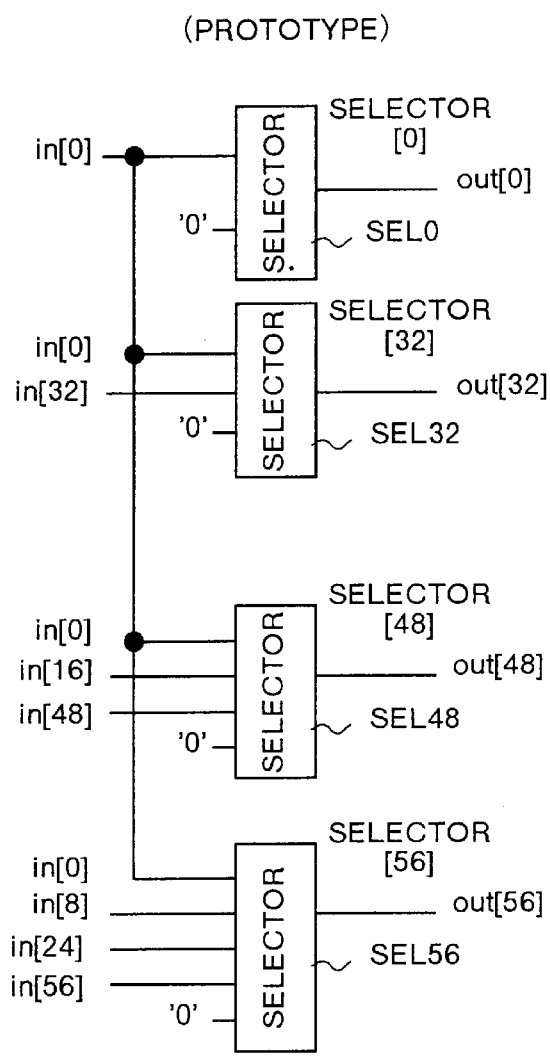
FIG. 13A and FIG. 13B are for explaining a design example 4 in the embodiment.

Next, description will be given to a design example 4 for designing a pass transistor selector circuit shown in FIG. 13B obtained by optimizing a pass transistor selector circuit (logic circuit) shown in FIG. 13A. The pass transistor selector circuit (prototype) shown in FIG. 13A is a data alignment circuit for fetching data of [0: 63] bits shown in FIG. 14 as effective b1ts in units of one byte (eight bits). In FIG. 13A, among [0: 63] bits to be outputted, selectors SEL0, SEL32, SEL48 and SEL56 corresponding to [0] bit, [32] bit, [48] bit and [56] bit, respectively are shown and selectors corresponding to the remaining bits are not shown.

The selector SEL0 selects either input bit [0] or '0' data based on a control signal and outputs the selected one as an output bit out [0]. The selector SEL32 selects one of input bits in [0], [32] and '0' data based on a control signal and outputs the selected one as an output bit out [32]. The selector SEL48 selects one of input bits in [0], [16], [48] and '0' data and outputs the selected one as an output bit out [48].

Further, the selector SEL56 selects one of input bits in [0], [8], [24], [56] and '0' data and outputs the selected one as an output bit out [56]. Here, the input bit [0] is an input bit common to the selectors SEL0, SEL32, SEL48 and SEL56.

The data alignment circuit shown in FIG. 13A is capable of outputting output data of five patterns in all according to control patterns 1 to 5 shown in FIG. 14. Namely, in the control pattern 1, '0' is selected by the control circuit in the selectors SEL0, SEL32 and SEL48. In the selector SEL56, the input bit [0] is selected by the control signal and outputted as an output bit [56]. Accordingly, in the control pattern 1, as shown in FIG. 14, output data of [0:55]='0' and [56:63]=one-byte data, are outputted.

Further, in the control pattern 4, with the output bit out [32] as the boundary of a drive segment, output data of [0:31]=four-byte data (byte0 to byte3 of input data), [32:63]=four-byte data (byte0 to byte3 of input data) are outputted. Namely, in the control pattern 4, both the selectors SEL0 and SEL32 select the input bit in [0]. Due to this, the control signals of the both selectors do not have an exclusive relationship therebetween. In that case, it is difficult to realize optimum buffering and the specifications do not satisfy the required specifications with regard to area, delay time, power consumption and the like.

Figure 13B:
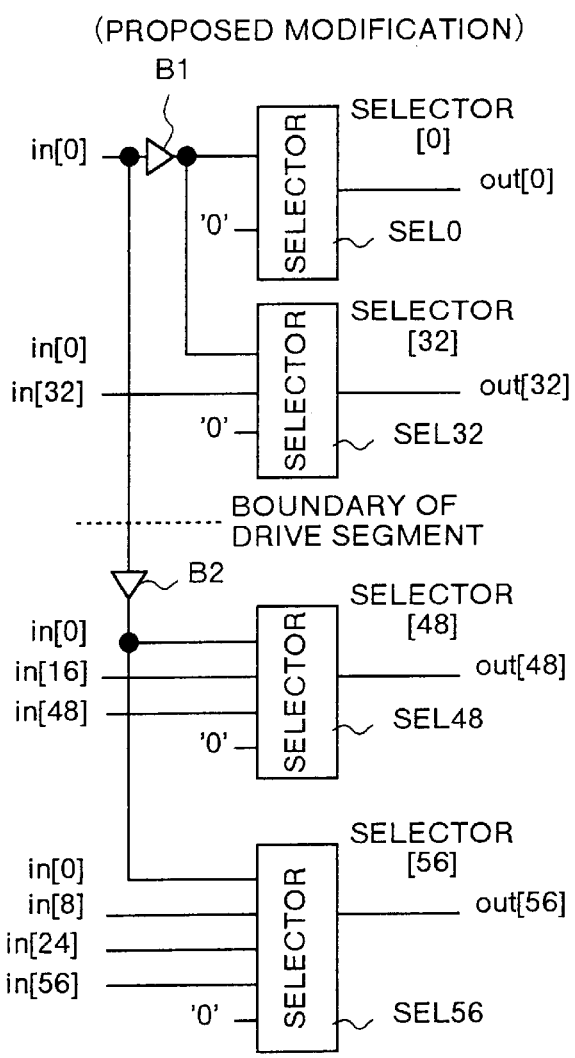

Considering this, in the design example 4, as shown in FIG. 13B, with the output bit out [32] as the boundary of a drive segment, a buffer B1 corresponding to the selectors SEL0 and SEL32 and a buffer B2 corresponding to the selectors SEL48 and SEL56 are provided and the buffers B1 ad B2 conduct buffering independently of each other, thereby making it possible to conduct optimum buffering.

Further, in the design example 4, the behavior/net list 10, the specification data 11 and the grouped description part data 12 (see FIG. 1) for realizing the optimization are created. It is noted that the pass transistor selector circuits shown in FIG. 13B are designed according to the flow chart shown in FIG. 8. The optimization method in the design example 4 (see FIG. 13B) is also applicable to a barrel shifter circuit or the like used for bit operation and realized irrespectively of the number of selections, the number of selectors connected in parallel, the number of input signals of a single selector, the type of pass transistors (NMOS, PMOS and transmission gate) and wiring length.

Design Example 5

Figure 15:
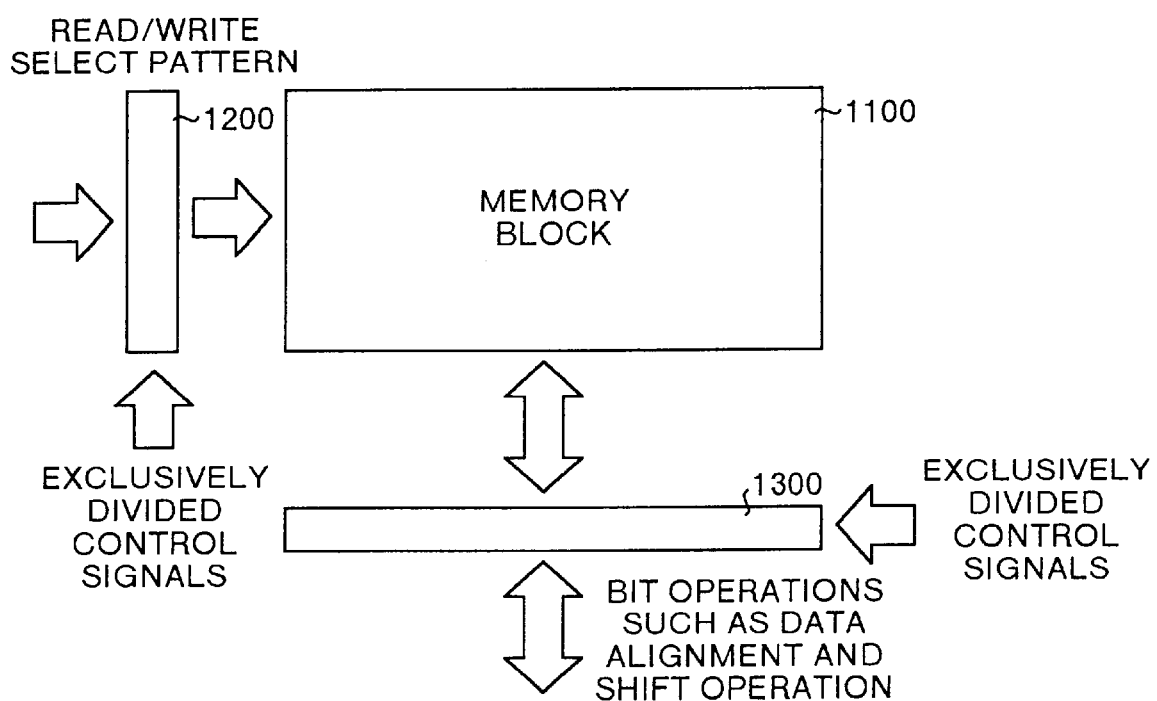
FIG. 15 is an explanatory view for a design example 5 in the embodiment.

In the design examples 1 to 4, description has been given about a case of microscopically optimizing the logic circuit while paying attention to the exclusive relationship between the control signals. As shown in FIG. 15, the optimization method is also applicable to a pass transistor selector circuit 1200 and a data path 1300 used for a memory block 1100 such as a RAM macro or a register array.

The latter case will be described hereinafter as a design example 5. In the memory block 1100, data read/write is controlled by the pass transistor selector circuit 1200. This pass transistor selector circuit 1200 is obtained by making a group of drive segments a macro group. The circuit 1200 selects read/write select pattern data using control signals divided in an exclusive manner and outputs the selected data to the memory block 1100. This pass transistor selector circuit 1200 can obtain the same advantages as those in the design examples 1 to 4.

Further, the data path 1300 is provided at the output side of the memory block 1100 and has the same functions as those of the pass transistor selector circuit shown in FIG. 13A and FIG. 13B. That is to say, the data path 1300 conducts data alignment and bit operation for shift operation and the like to the read data, according to control signals divided in an exclusive manner. In the design example 4, the behavior/net list 10, the specification data 11 and the grouped description part data 12 (see FIG. 1) for realizing the optimization of the pass transistor selector circuit 1200 and the data path 1300, are created. It is noted that the pass transistor selector circuit 1200 and the data path 1300 shown in FIG. 15 are designed according to the flow chart shown in FIG. 8.

One embodiment according to the present invention has been described in detail so far, with reference to the accompanying drawings. It should be noted that concrete constitution examples of the preset invention are not limited to this embodiment and that any design changes and the like within the range of the scope of the present invention are included in the invention.

Figure 16:
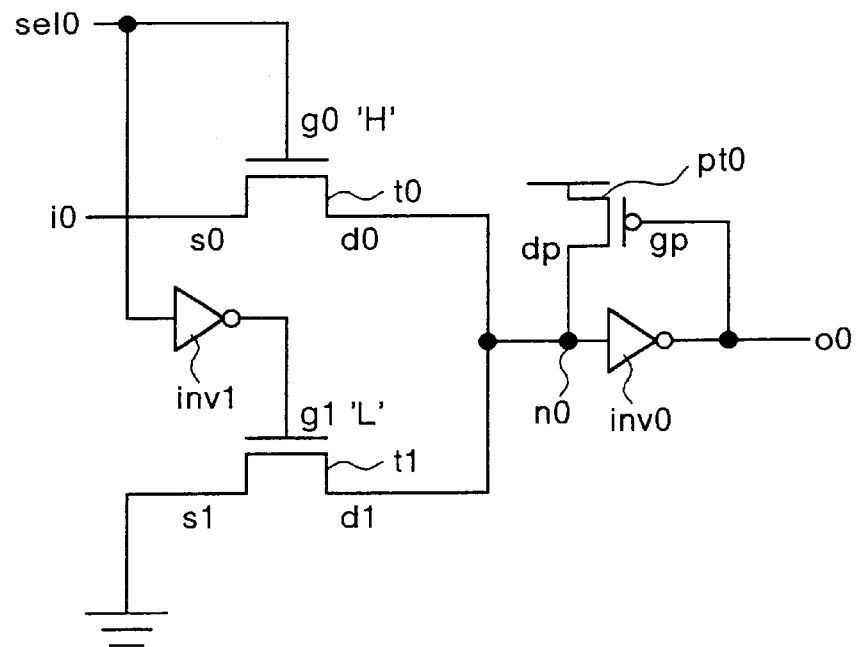
FIG. 16 is an explanatory view for a modified example 1 of the embodiment.

For example, as a modified example 1 of one embodiment, an NAND circuit shown in FIG. 16 instead of each of the selectors $x_0$ to $x_3$ shown in FIG. 10 may be provided. In the NAND circuit shown in FIG. 16, pass transistors t0, t1 and an inverter inv1 are provided at the input side of a node n0 and an inverter inv0 and a voltage holding PMOS transistor pt0 are provided at the output side of the node n0. The continuities of the pass transistors t0 and t1 are controlled by a control signal sel0. The drains of the respective pass transistors t0 and t1 are connected to the common node n0.

An input terminal i0 at the source side of the pass transistor t0 is set to have a potential equal to the potential of the input terminal at the source side of the other pass transistor through a wiring (not shown). In the NAND circuit shown in FIG. 16, the inverter inv1 may be provided at the control signal sel0-side of the pass transistor t0, the source side of the pass transistor to may be grounded and the source side of the pass transistor t1 may be set as the input terminal i0.

Figure 17:
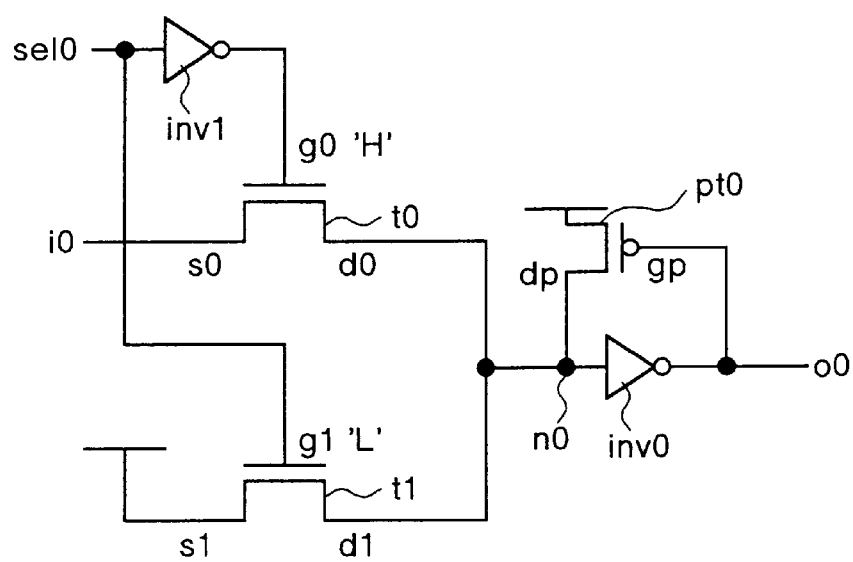
FIG. 17 is an explanatory view for a modified example 2 of the embodiment.

Furthermore, as a modified example 2 of one embodiment stated above, an NOR circuit shown in FIG. 17 instead of each of the selectors $x_0$ to $x_3$ shown in FIG. 10 may be provided. In the NOR circuit shown in FIG. 17, pass transistors t0, t1 and an inverter inv1 are provided at the input side of a node n0 and an inverter inv0 is provided at the output side of the node n0. The continuities of the pass transistors t0 and t1 are controlled by a control signal sel0. The drains of the respective pass transistors t0 and t1 are connected to the common node n0.

An input terminal i0 at the source side of the pass transistor t0 has a potential equal to the potential of an input terminal at the source side of the other pass transistor through a wiring (not shown). In the NOR circuit shown therein, the inverter inv1 may be provided at the transistor t1 side, the source side of the pass transistor t0 may have a predetermined potential and the source side of the pass transistor t1 may be set as an input terminal i0.

Figure 18:
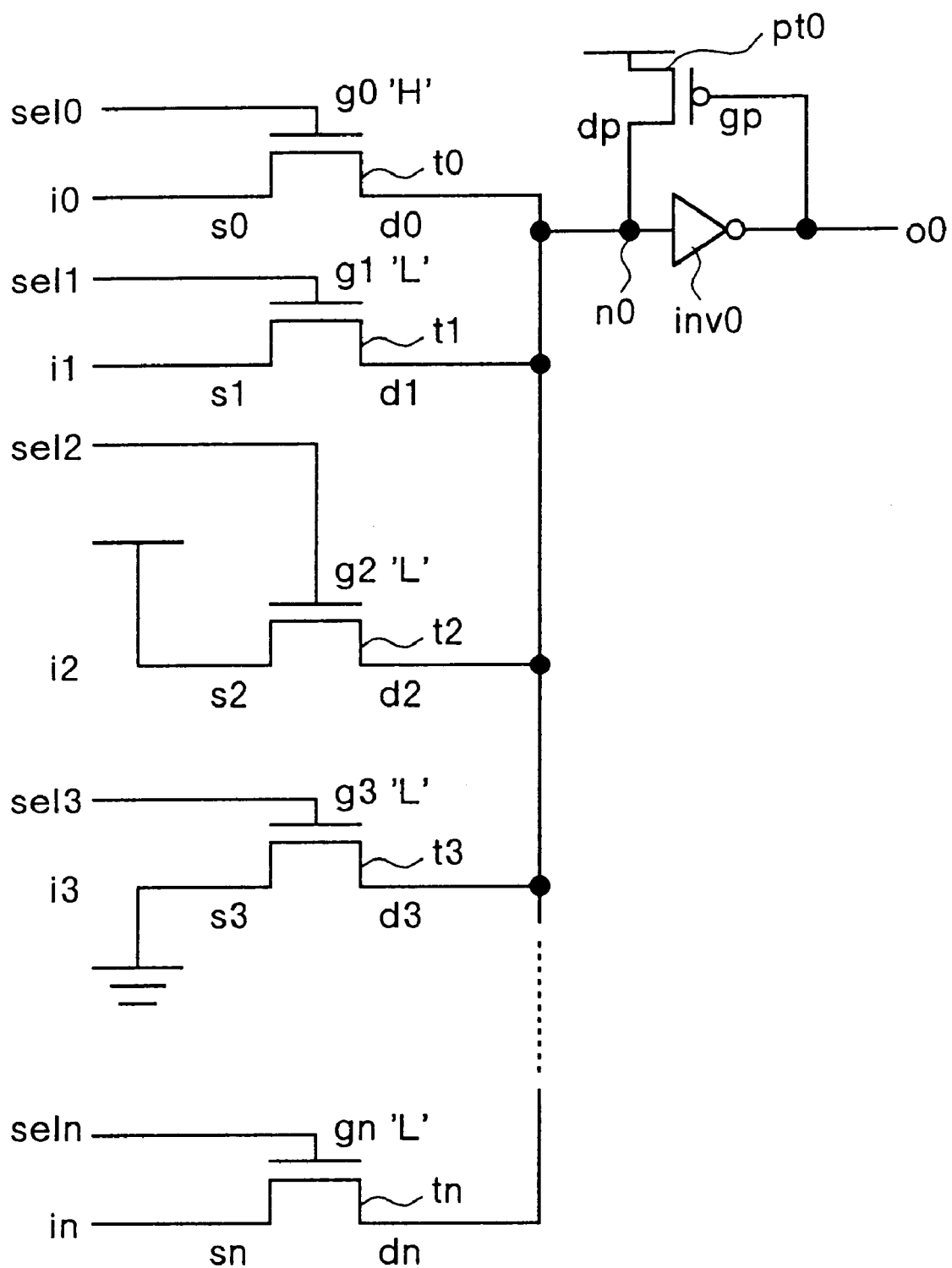
FIG. 18 is an explanatory view for a modified example 3 of the embodiment.

Moreover, as a modified example 3 of one embodiment stated above, a circuit shown in FIG. 18 instead of each of the selectors $x_0$ to $x_3$ shown in FIG. 10 may be provided. In the circuit shown in FIG. 18, pass transistors t0 to tn are provided at the input side of a node n0 and an inverter inv0 and a voltage holding PMOS transistor pt0 are provided at the output side of the node n0.

The continuities of these pass transistors t0 to tn are controlled by control signals sel0 to seln, respectively. An input terminal i0 at the source side of the pass transistor t0 is set to have a potential equal to the potential of an input terminal at the source side of the other pass transistor through a wiring (not shown). The drains of the respective pass transistors t0 to tn are connected to the common node n0. In the circuit shown in FIG. 18, the pass transistor t2 or pass transistor t3 may be omitted.

Figure 19:
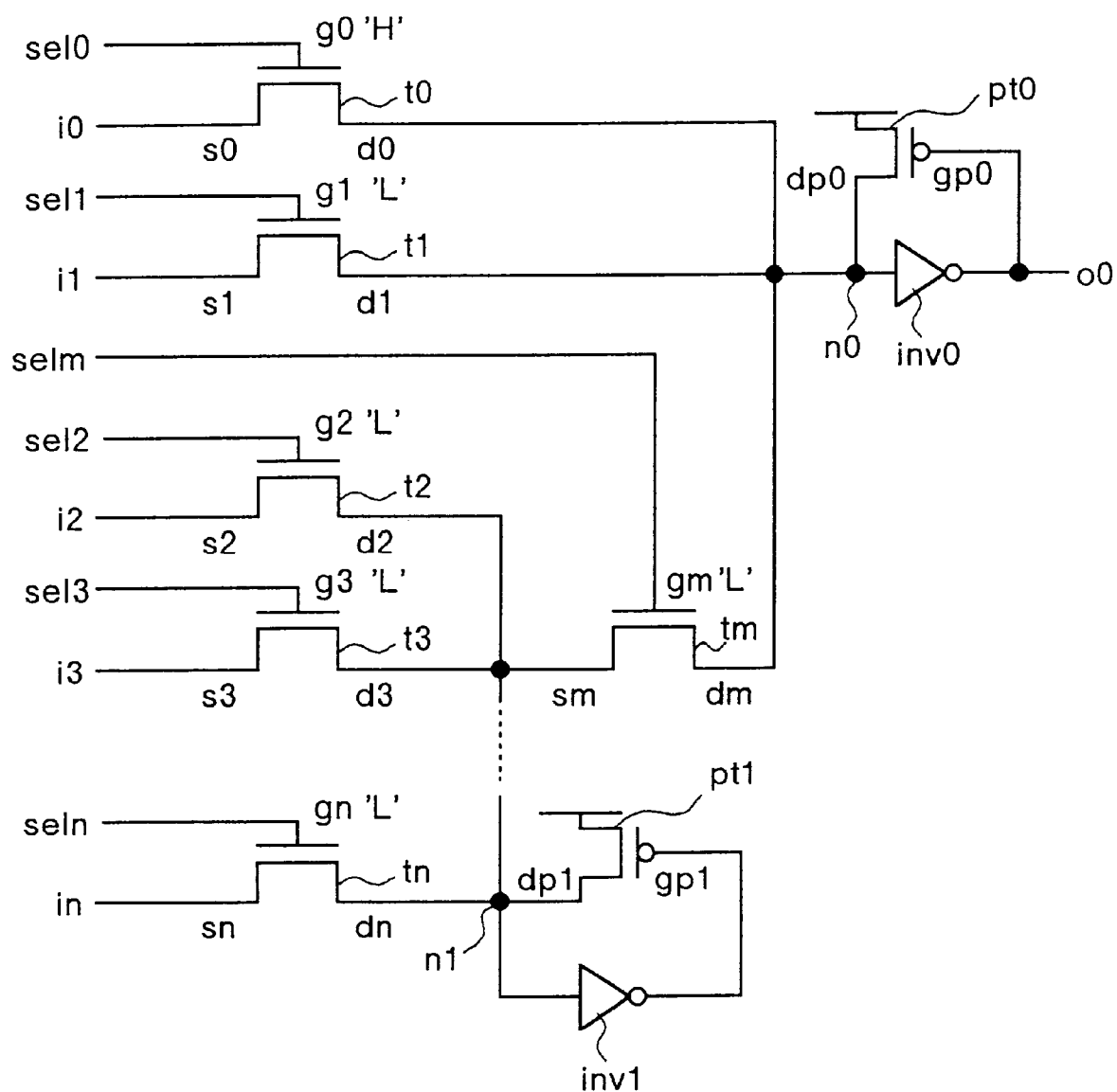
FIG. 19 is an explanatory view for a modified example 4 of the embodiment.

Furthermore, as a modified example 4 of one embodiment stated above, a multi-stage circuit shown in FIG. 19 instead of each of the selectors $x_0$ to $x_3$ shown in FIG. 10 may be provided. In the circuit shown in FIG. 19, pass transistors t0 to tn, a pass transistor tm, an inverter inv1 and a voltage holding PMOS transistor pt1 are arranged at the input side of a node n0 and an inverter inv0 and a voltage holding PMOS transistor pt0 are arranged at the output side of the node n0.

The circuit shown therein is intended to reduce a load capacity seen from the input terminals i0 and i1. The continuities of the pass transistors t0 to tn and the pass transistor tm are controlled by control signals sel0 to seln and selm, respectively. The circuit shown therein may be constituted to dispense with pull-up circuits (the inverter inv1 and the voltage holding PMOS transistor pt1).

Figure 20:
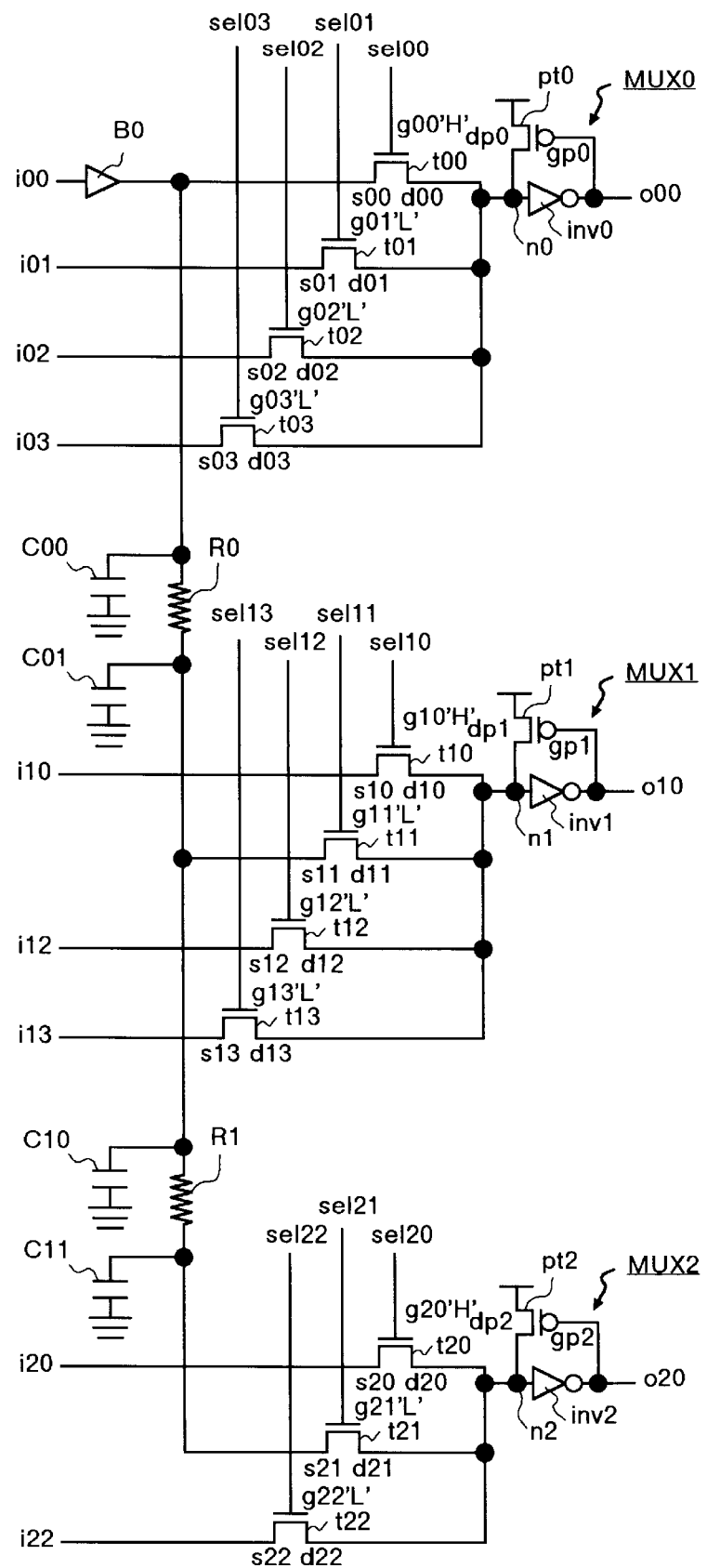
FIG. 20 is an explanatory view for a modified example 5 of the embodiment.

As a modified example 5 of one embodiment stated above, a circuit shown in FIG. 20 instead of the buffer B0 and the circuits $x_0$ and $x_1$ (buffer B1, circuits $x_2$ and $x_3$) shown in FIG. 10 may be arranged. The circuit shown in FIG. 20 consists of a buffer B0, selectors MUX0 to MUX2. The selector MUX0 consists of pass transistors t00, t01, t02 and t03 provided at the input side of a node n0 and an inverter inv0 and a voltage holding PMOS transistor pt0 provided at the output side of the node n0. The continuities of these pass transistors t00, t01, t02 and t03 are controlled by control signals sel00, sel01, sel02 and sel03, respectively.

The selector MUX1 consists of pass transistors t10, t11, t12 and t13 provided at the input side of the node n1 and an inverter inv1 and a voltage holding PMOS transistor pt1 provided at the output side of the node n1. The continuities of these pass transistors t10, t11, t12 and t13 are controlled by control signals sel10, sel11, sel12 and sel13, respectively.

The selector MUX2 consists of pass transistors t20, t21, t22 and t23 provided at the input side of the node n2 and an inverter inv2 and a voltage holding PMOS transistor pt2 provided at the output side of the node n2. The continuities of these pass transistors t20, t21, t22 and t23 are controlled by control signals sel20, sel21, sel22 and sel23, respectively.

In the circuit shown in FIG. 20, the sources s00, s11 and s21 of the respective pass transistors t00, t11 and t21 are connected to a common buffer B0 through wirings. Here, the control signals sel00, sel11 and sel21 controlling the continuities of the pass transistors t00, t11 and t21, respectively, have an exclusive relationship therebetween. Therefore, if the level of one control signal out of these control signals sel00, sel11 and sel21 is H, the levels of the other control signals are L.

Capacitors C00, C01 and a resistance R0 correspond to the capacities and resistance of a wiring connecting the buffer B0 to the source s11 of the pass transistor t11. Likewise, capacitors C10, C11 and a resistance R1 correspond to the capacities and resistance of a wiring connecting the source s11 of the pass transistor t11 to the source s21 of the pass transistor t21. In the modified example 5, description has been given while assuming that control signals having an exclusive relationship therebetween are control signals sel00, sel11 and sel21. The other combination of control signals is also applicable.

In the modified example 5 (see FIG. 20), if wirings connecting the buffer B0 to the sources s00, s11 and s21 of the respective pass transistors t00, t11 and t21 are long, the load capacity seen from the side of the buffer B0 increases. To avoid this, the wirings may be cut off in the middle so as to reduce the load capacity by utilizing the exclusive relationship among the control signals sel00, sel11 and sel21. This constitution will be described hereinafter as a modified example 6.

Figure 21:
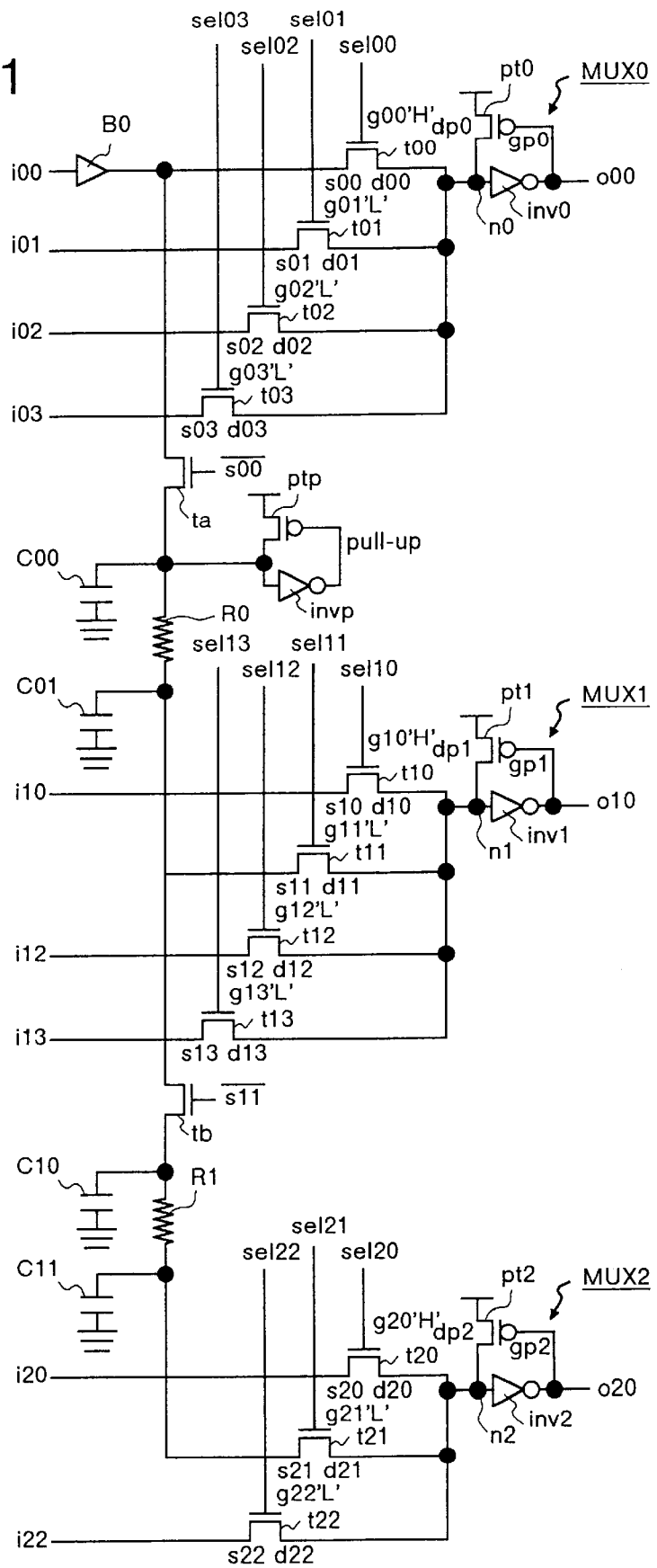
FIG. 21 is an explanatory view for a modified example 6 of the embodiment.

FIG. 21 is an explanatory view for the modified example 6 of one embodiment already stated above. In FIG. 21, parts corresponding to those in FIG. 20 are denoted by the same reference symbols as those in FIG. 20. In FIG. 21, a pass transistor ta is interposed in the middle of a wiring (at a buffer B0 side) connecting a buffer B0 to the source s11 of a pass transistor t11. The continuity of the pass transistor ta is controlled by a control signal sel00 (inversion) inverted from a control signal sel00. Therefore, if the level of the control signal sel00 is H and the pass transistor t00 is continuous, the level of the control signal sel00 (inversion) is L and the pass transistor ta is cut off. Thus, the wiring capacity and resistance seen from the side of the buffer B0 are reduced by those of the downstream part of the pass transistor ta.

An inverter invp and a voltage holding PMOS transistor ptp constitute a pull-up circuit and are connected to one end of a resistance R0. This pull-up circuit is intended to improve the electric characteristics relating to wirings when the pass transistor ta is continuous.

Also, in the circuit shown in FIG. 21, a pass transistor tb is interposed in the middle (at a source s11 side) of a wiring connecting the source s11 of the pass transistor t11 to the source s21 of the pass transistor t21. The continuity of the pass transistor tb is controlled by a control signal sel11 (inversion) inverted from a control signal sel11. Therefore, if the level of the control signal sel11 is H and the pass transistor t00 is continuous, the level of the control signal sel11 (inversion) is L and the u transistor tb is cut off. Thus, the wiring capacity and resistance seen from the side of the buffer B0 are reduced by those of the downstream part of the pass transistor tb.

Figure 22:
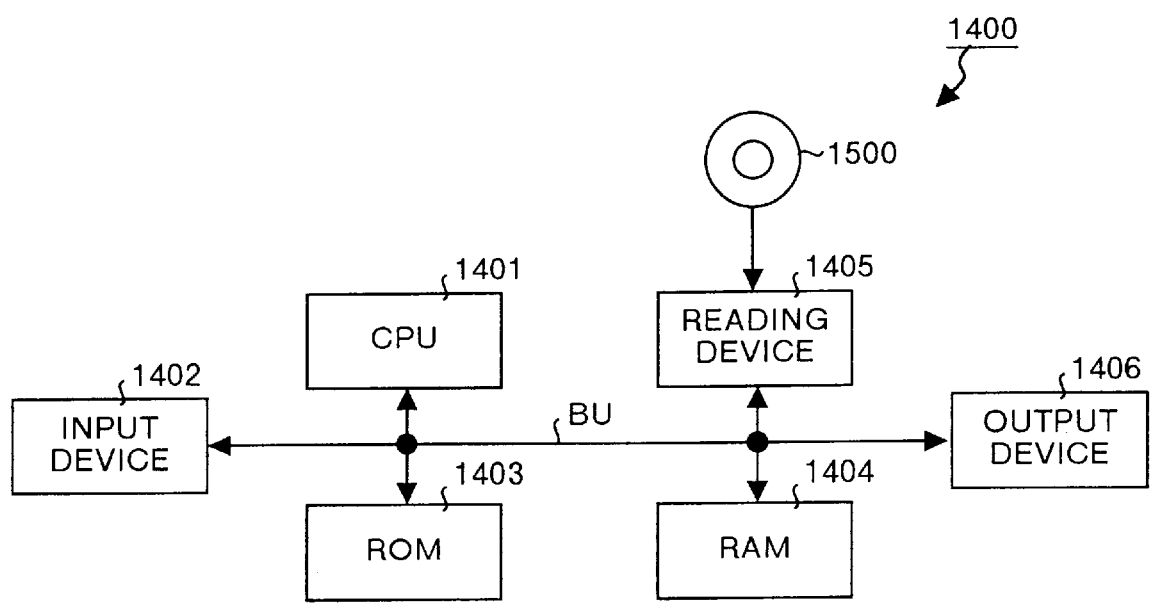
FIG. 22 is a block diagram showing a modified example 7 of the embodiment.

Furthermore, as a modified example 7 of one embodiment already stated above, a logic circuit optimization program for realizing the above-stated functions may be recorded on a computer readable recording medium 1500 shown in FIG. 22 and the logic circuit optimization program recorded on this recording medium 1500 may be read and executed by a computer 1400, thereby designing and optimizing the logic circuit.

The computer 1400 shown in FIG. 22 consists of a CPU 1401 executing the logic circuit optimization program, an input device 1402 such as a keyboard and a mouse, an ROM (Read Only Memory) 1403 storing various data, an RAM (Random Access Memory) 1404 storing operation parameters and the like, a reading device 1405 reading the logic circuit optimization program from the recording medium 1500, an output device 1406 such as a display and a printer, and a bus BU connecting the respective constituent elements of the computer 1400.

The CPU 1401 reads the logic circuit optimization program recorded on the recording medium 1500 through the reading device 1405, executes the logic circuit optimization program and thereby designs and optimizes the logic circuit. The recording medium 1500 may be not only a portable type recording medium such as an optical disk, a floppy disk or a hard disk, but also a transmission medium, such as a network, temporarily holding data.

In one embodiment stated above, the logic circuit optimization device (CAD) shown in FIG. 1 has been described. The present invention is also applicable to a macro design such as a full-custom macro design or a semi-custom macro design. Accordingly, the pass transistor selector circuit itself described in the embodiment is also contained in the present invention.

As explained above, according to one embodiment of the present invention, a plurality of control signals have an exclusive relationship therebetween, i.e., the control signals do not become active simultaneously, a circuit is divided into a plurality of ranges each having an equal potential as drive segments to thereby drive the drive segments independently using the buffers B0 and B1 (see FIG. 10), respectively. Thus, it is possible to easily optimize buffering and to obtain a logic circuit excellent in electric characteristics compared with a conventional circuit.

Furthermore, a plurality of control signals have an exclusive relationship therebetween, i.e., the control signals do not become active simultaneously, a circuit is divided into a plurality of ranges each having an equal potential as drive segments to thereby drive the drive segments independently using buffers, respectively. Thus, the present invention can advantageously, easily optimize buffering and obtain a logic circuit excellent in electric characteristics, compared with a conventional circuit.

Furthermore, the logic specification indication unit indicates logic specifications so that a plurality of control signals have an exclusive relationship therebetween, i.e., the control signals do not become active simultaneously, and logic composition and the optimization of buffering are conducted based on the logic specifications and cell data. Thus, the present invention can advantageously optimize the buffering of a logic circuit employing pass transistors and obtain a logic circuit excellent in electric characteristics.

Furthermore, in a logic specification indication step, logic specifications are indicated so that a plurality of signals have an exclusive relationship therebetween, i.e., the control signals do not become active simultaneously, and logic composition and the optimization of buffering are conducted based on the logic specification and cell data. Thus, the present invention can advantageously optimize the buffering of a logic circuit employing pass transistors and obtain a logic circuit excellent in electric characteristics.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A pass transistor circuit comprising:
   a plurality of pass transistors connected in parallel and each one having input terminals and output terminals, wherein the same input signal is being inputted into said input terminals of said pass transistors, and wherein groups of the output terminals of the pass transistors are connected to different nodes, and continuities of the plurality of said pass transistors is being controlled by a plurality of control signals having an exclusive relationship therebetween;

means for reducing delay differences among the outputs of the plurality of pass transistors connected in parallel; and a plurality of buffers which drive drive segments including at least said pass transistors and wirings, the drive segments being a plurality of divided ranges each having an equal potential.

2. The pass transistor circuit according to claim 1, wherein each of said buffer has a driving force capable of driving a necessary, sufficient load capacity with a reference to the worst value of the load capacity of said drive segments.

3. The pass transistor circuit according to claim 1, wherein said buffers are provided corresponding to a part of said drive segments.

4. The pass transistor circuit according to claim 1, wherein said pass transistor circuit is a bit shift circuit applying a select logic of the pass transistors and operating output bits relative to input bits.

5. A pass transistor circuit design method comprising:

a first step of designing a plurality of pass transistors connected in parallel and having input terminals, respectively, into which input terminals the same input signal is inputted and wherein groups of the output terminals of the pass transistors are connected to different nodes, continuities of the plurality of pass transistors controlled by a plurality of control signals having an exclusive relationship therebetween;

a second step of designing a plurality of buffers respectively driving drive segments including at least the plurality of pass transistors and wirings, the drive segments being a plurality of divided ranges each having an equal potential; and a third step of designing a means for reducing delay differences among the outputs of the plurality of pass transistors connected in parallel.

* * * * *